US005706093A

United States Patent [19]
Komiya

[11] Patent Number: 5,706,093
[45] Date of Patent: Jan. 6, 1998

[54] COLOR CLASSIFICATION APPARATUS

[75] Inventor: Yasuhiro Komiya, Hachioji, Japan

[73] Assignee: Olympus Optical Co., Ltd., Tokyo, Japan

[21] Appl. No.: 753,783

[22] Filed: Dec. 2, 1996

[30] Foreign Application Priority Data

Dec. 5, 1995 [JP] Japan ................................ 7-316422

[51] Int. Cl.$^6$ ................................................ G01N 21/27
[52] U.S. Cl. ................................................ 356/418; 356/419
[58] Field of Search ................................ 356/418, 419

[56] References Cited

U.S. PATENT DOCUMENTS 5,164,795  11/1992  Conway ............................... 356/418
5,221,959  6/1993   Ohyama et al. ..................... 356/418

OTHER PUBLICATIONS

"Image Classification by the Foley-Sammon Transform", by Q. Tian, et al, Optical Engineering, vol. 25, No. 7, pp. 834–840, Jul., 1986.

Primary Examiner—Vincent P. McGraw
Attorney, Agent, or Firm—Frishauf, Holtz, Goodman, Langer & Chick, P.C.

[57] ABSTRACT

A color classification apparatus for classifying the color component of a target object includes an imaging optical system, an image pickup device, optical bandpass filters, a transmission wavelength selection unit, a storage unit, a read unit, and a correction unit. The image pickup device is arranged on the imaging plane of the imaging optical system. The optical bandpass filters are optically arranged upstream the image pickup device, and have a plurality of different selectable optical transmission wavelength bands. The transmission wavelength selection unit selects one transmission wavelength band from the plurality of optical transmission wavelength bands. The storage unit stores each image information which has passed through the optical bandpass filter having the transmission wavelength band selected by the transmission wavelength selection unit and is picked up by the image pickup device, and transmission wavelength band information selected by the transmission selection means in correspondence with each other. The read unit performs read access, from the storage unit, to an area corresponding to the target object in the image information. In accordance with a positional shift of each image information of the target object stored in the storage means, the correction unit corrects the area of each image information to be read by the read unit.

17 Claims, 32 Drawing Sheets

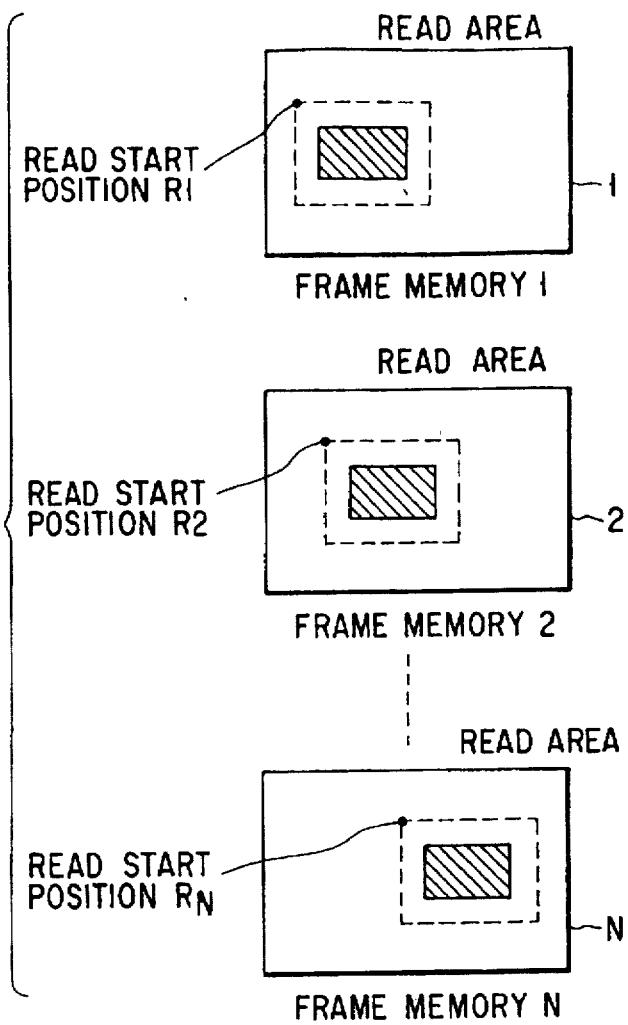
FIG. 3
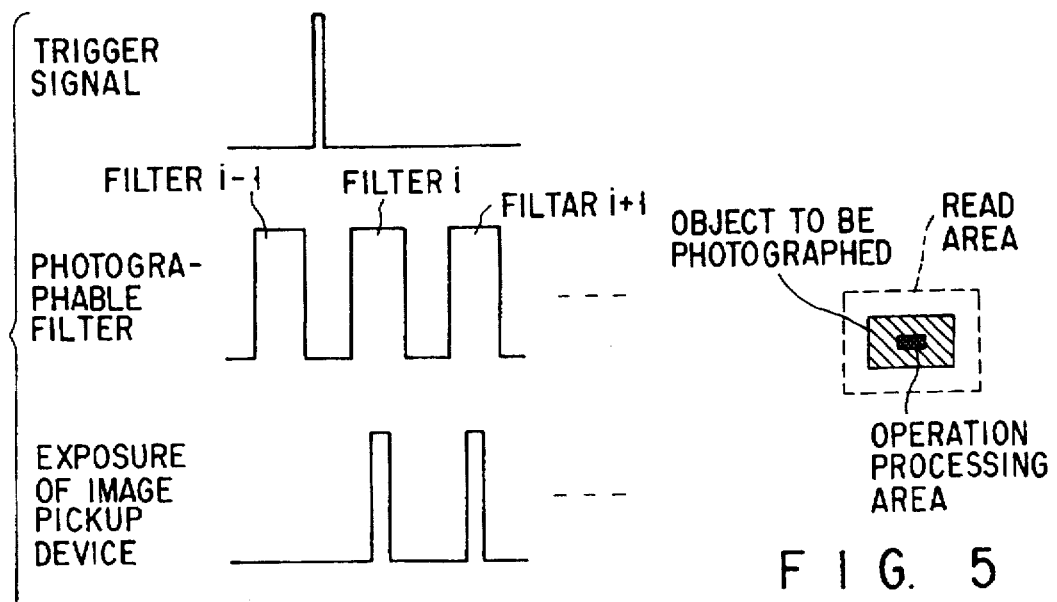
FIG. 4
FIG. 5

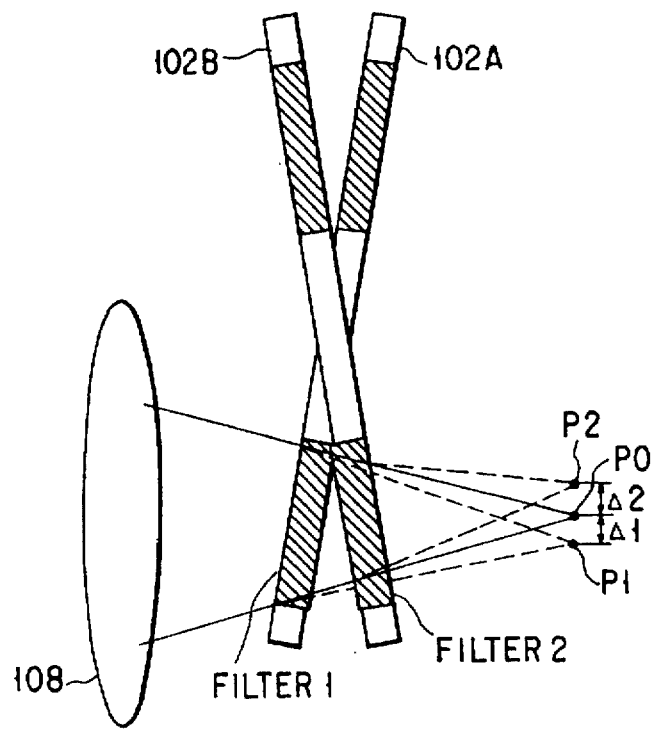
F I G. 6A
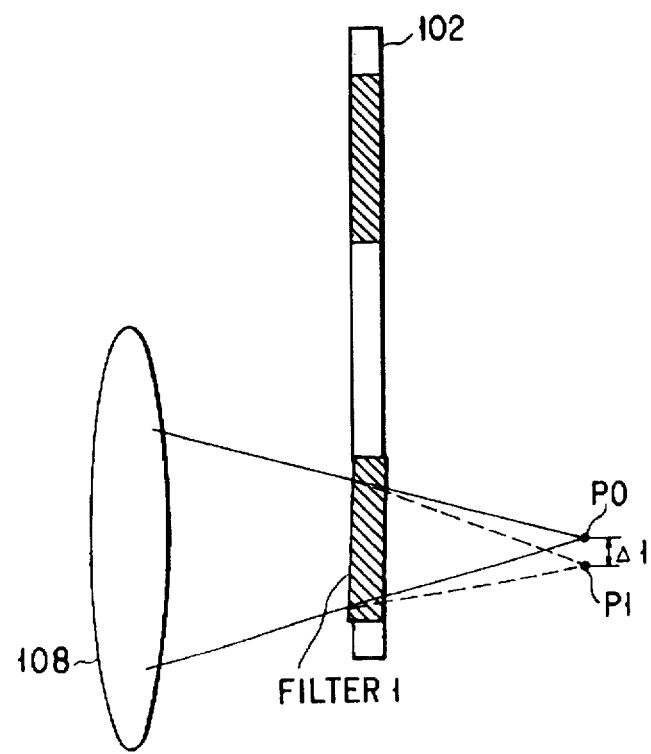
F I G. 6B

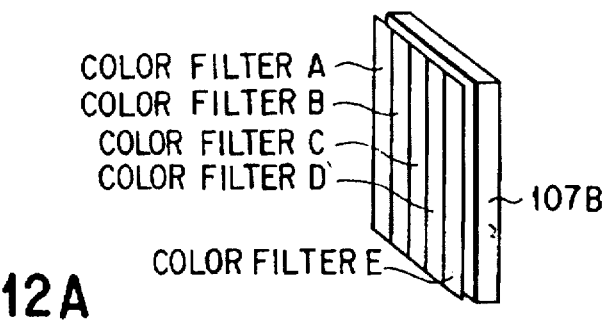
FIG. 12A
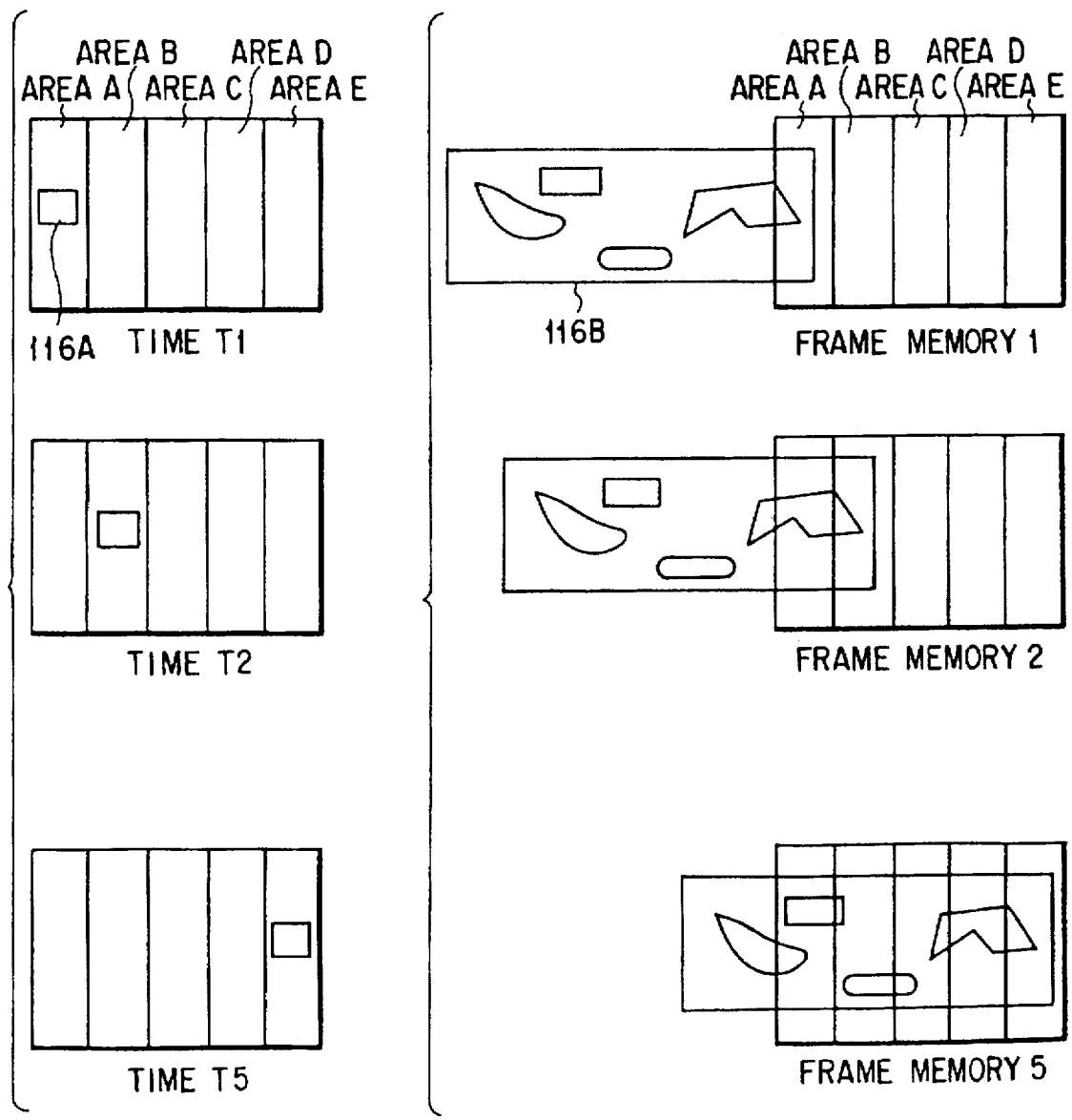
FIG. 12B
FIG. 12C

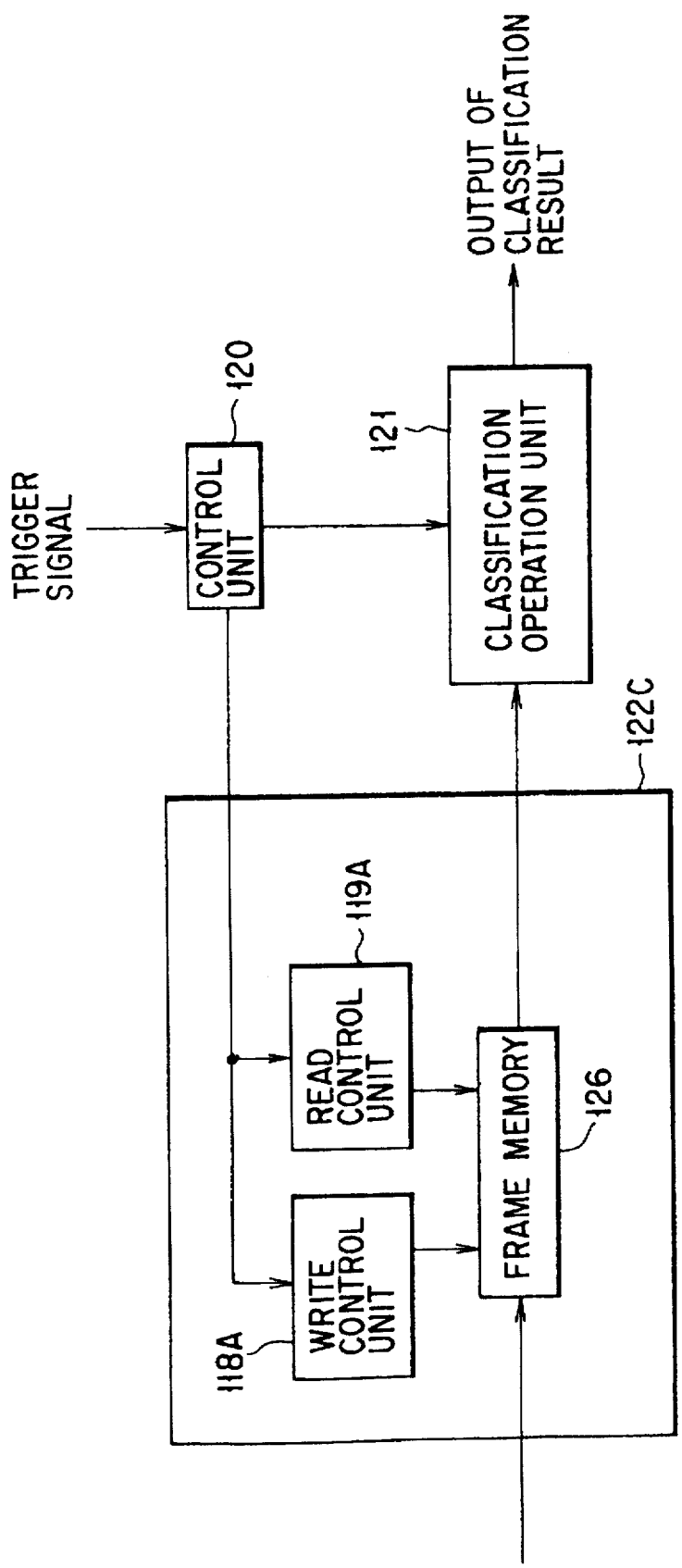

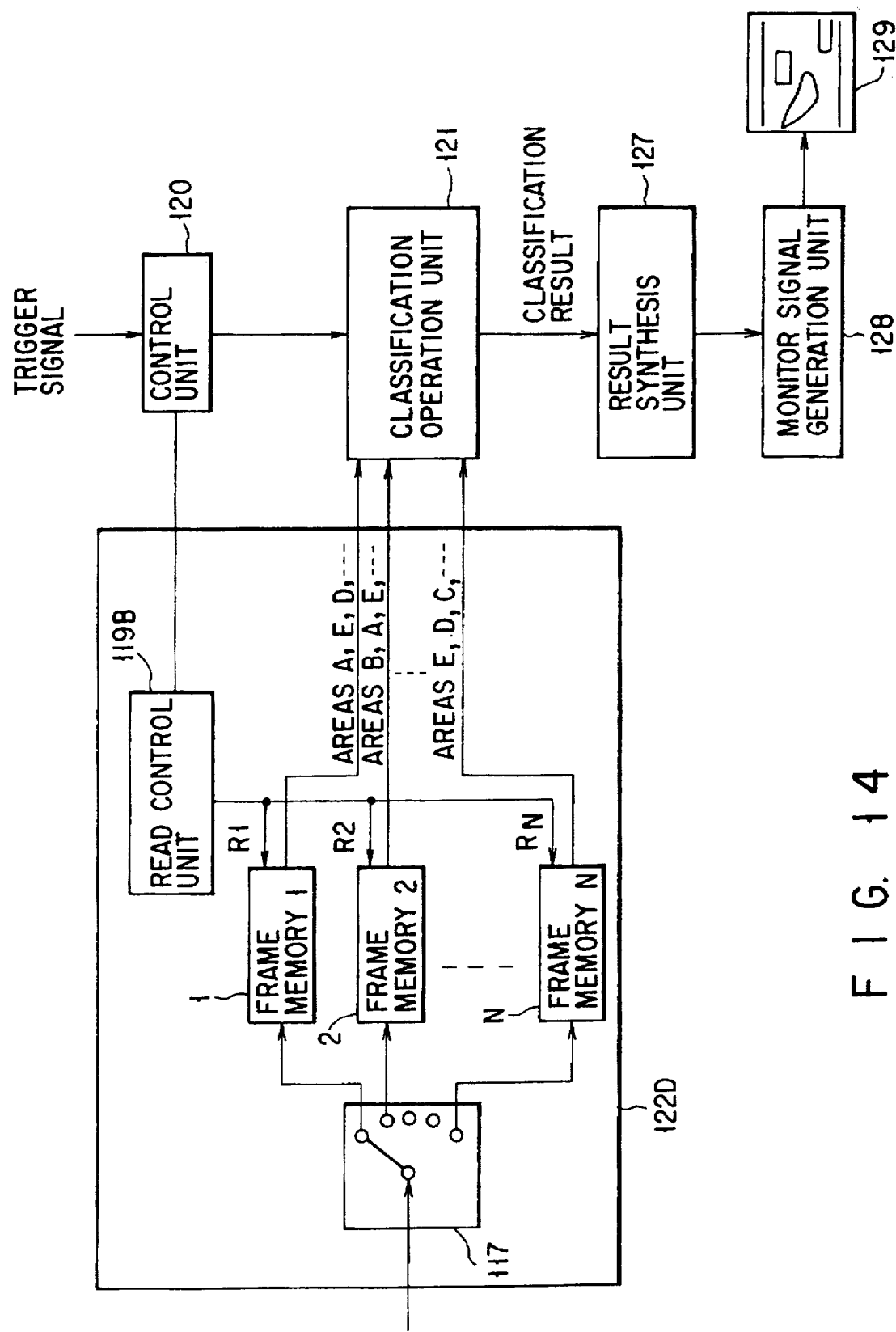
F I G. 14

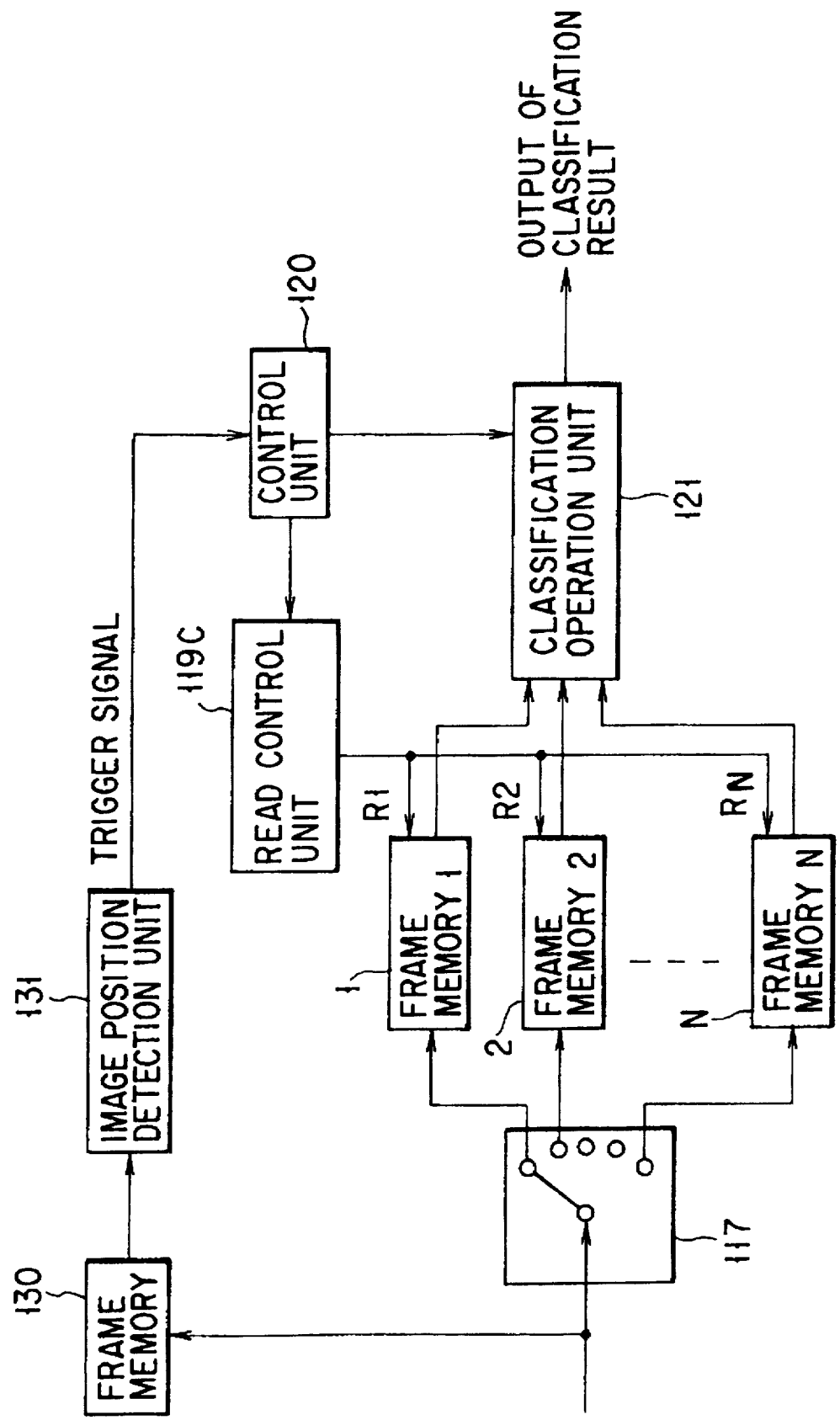
F I G. 15

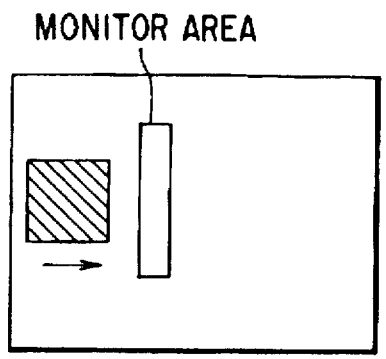
F I G. 16
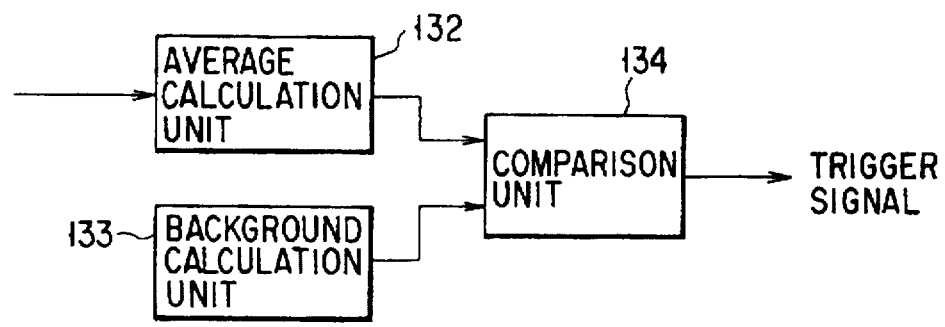
F I G. 17A
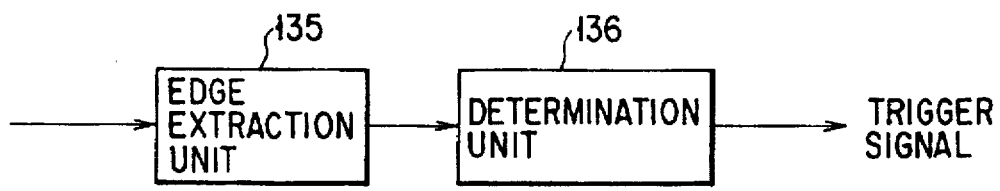
F I G. 17B
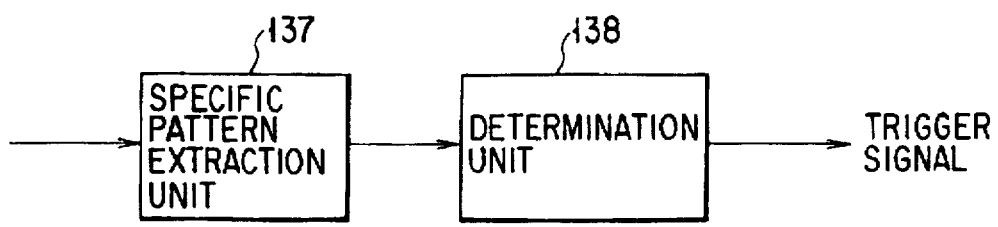
F I G. 17C

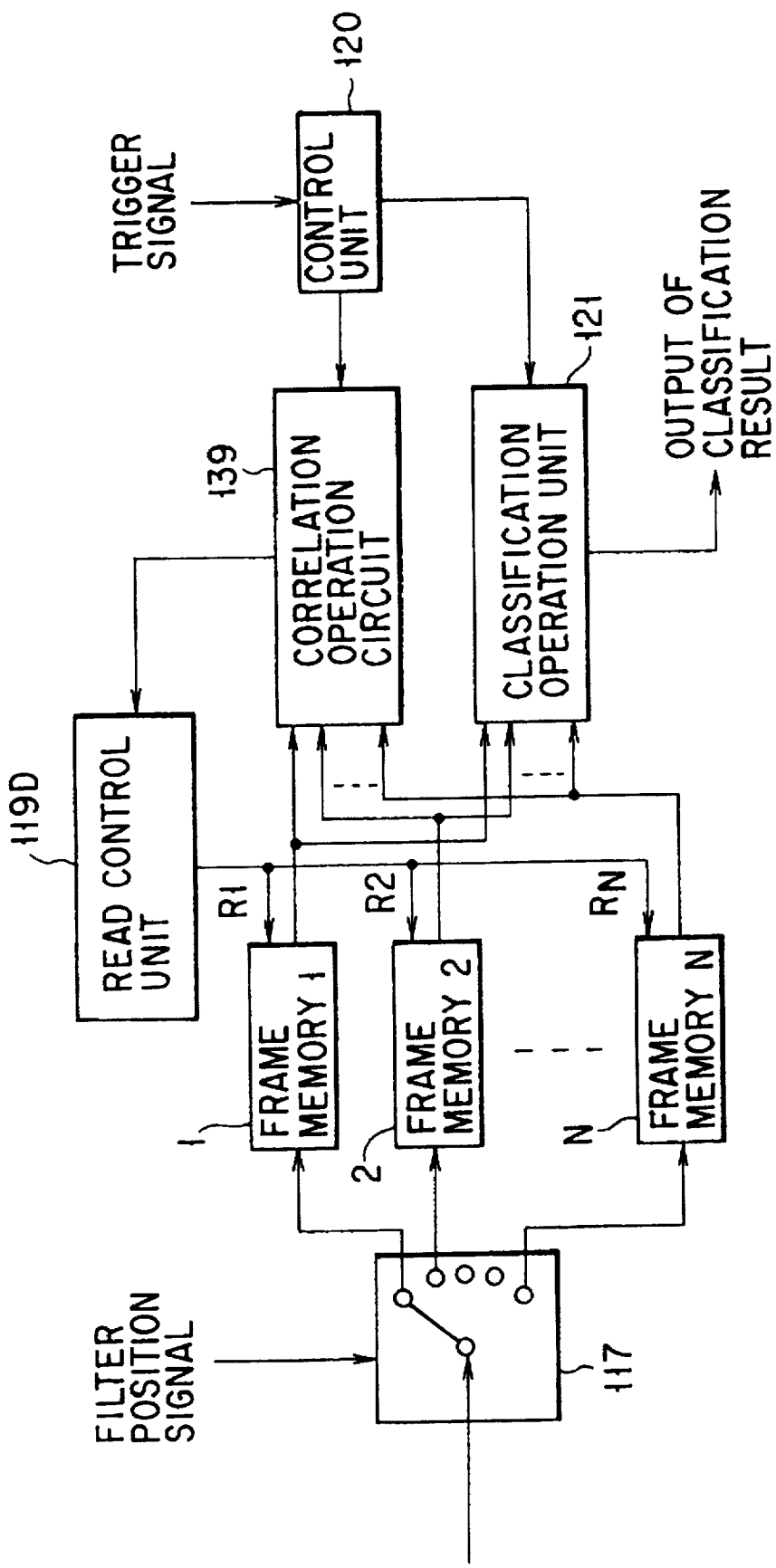
F I G. 21

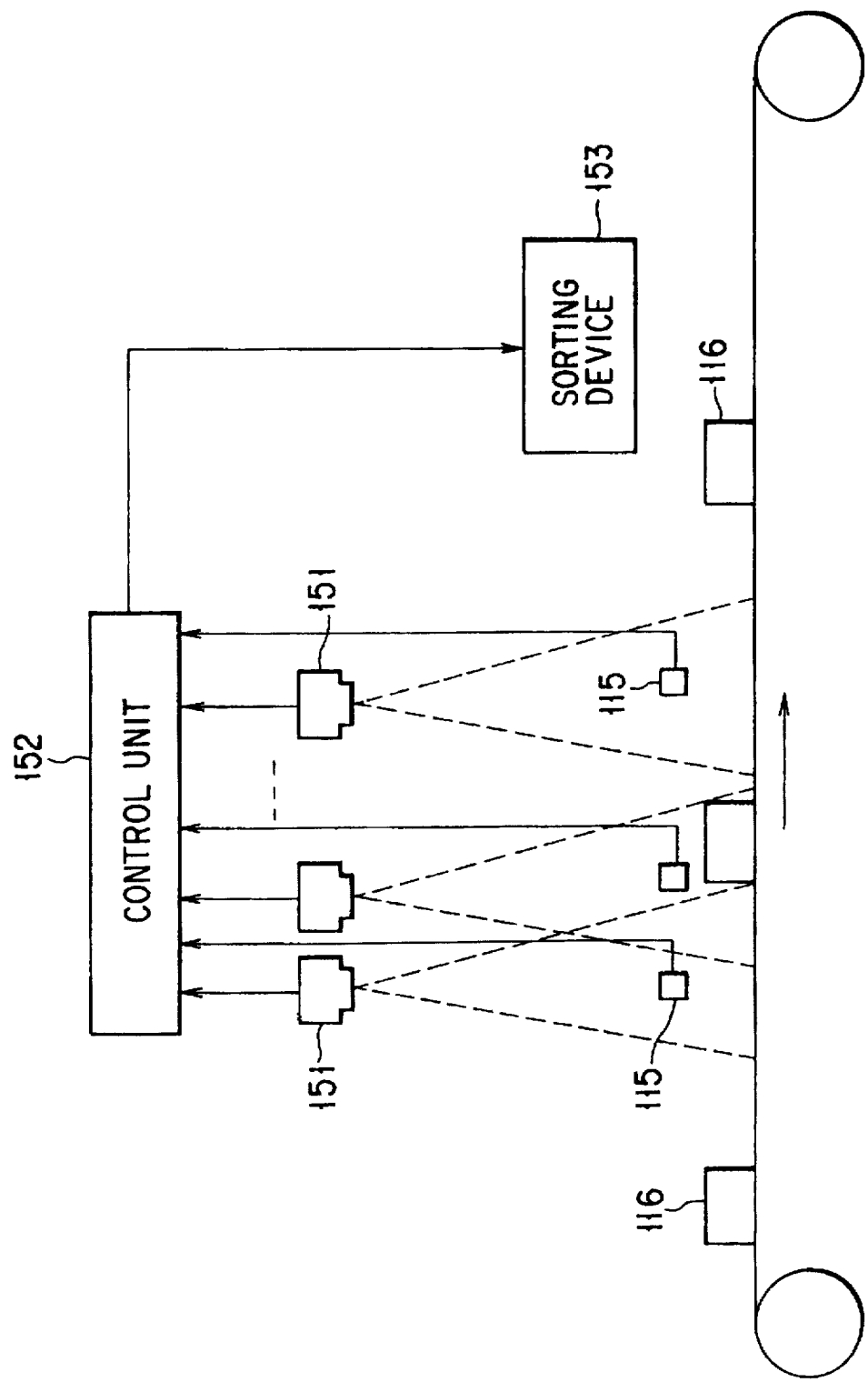
F I G. 30

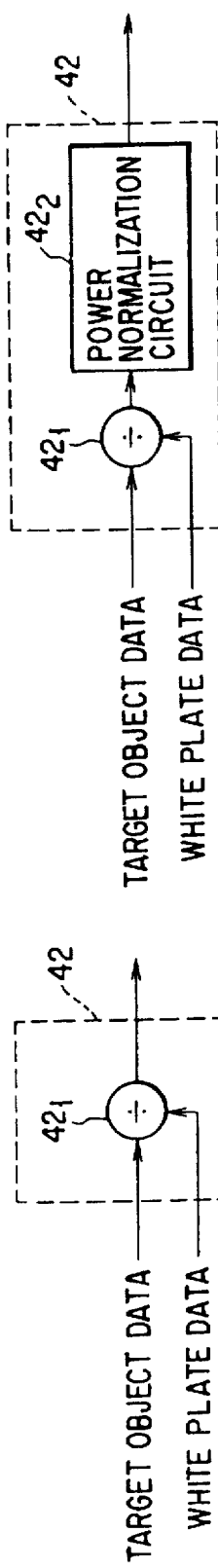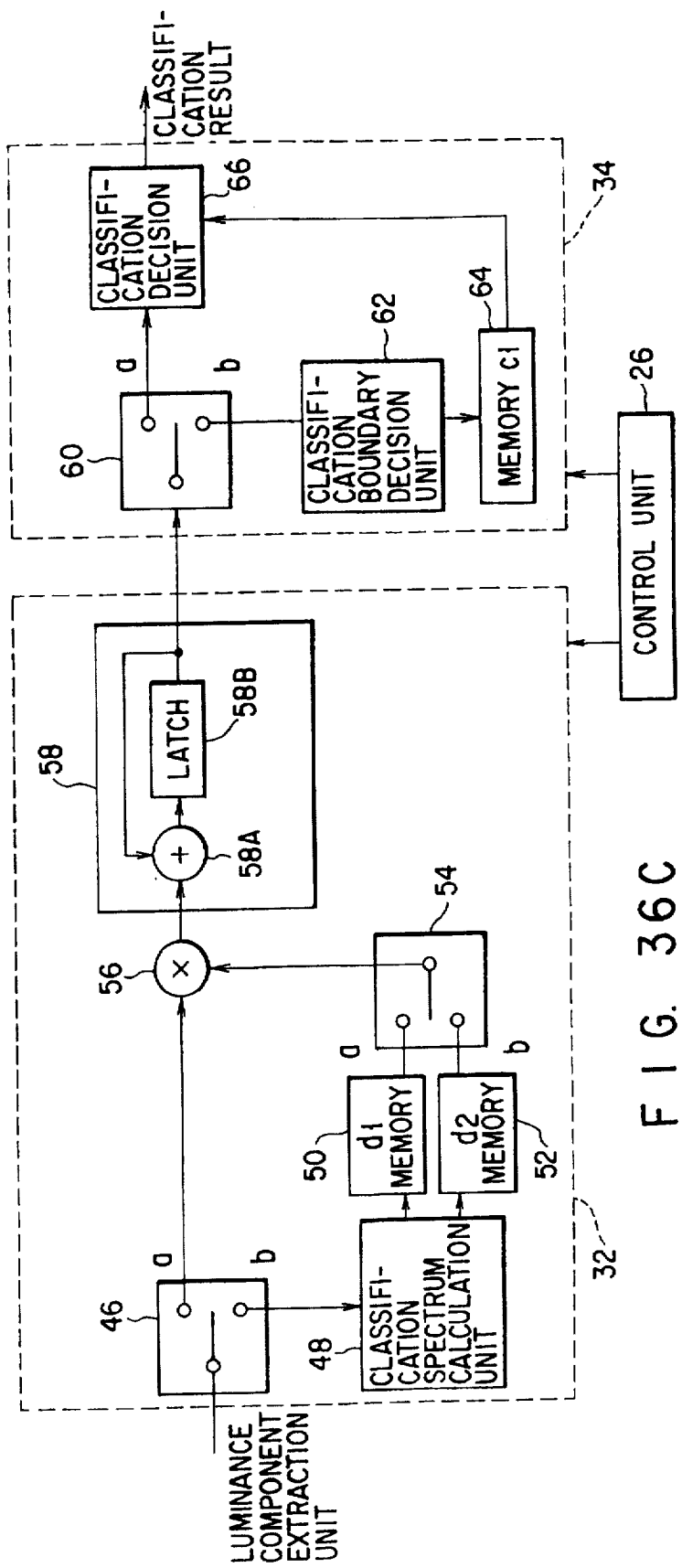
F I G. 36A
F I G. 36B
F I G. 36C

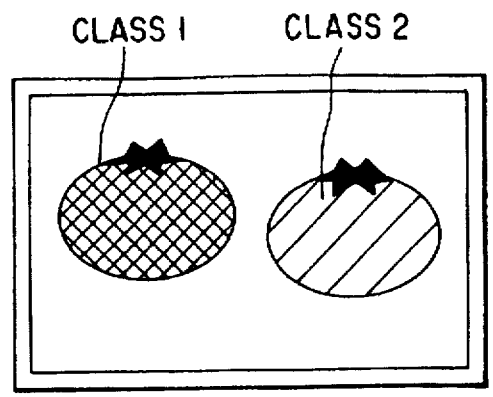
F I G. 37
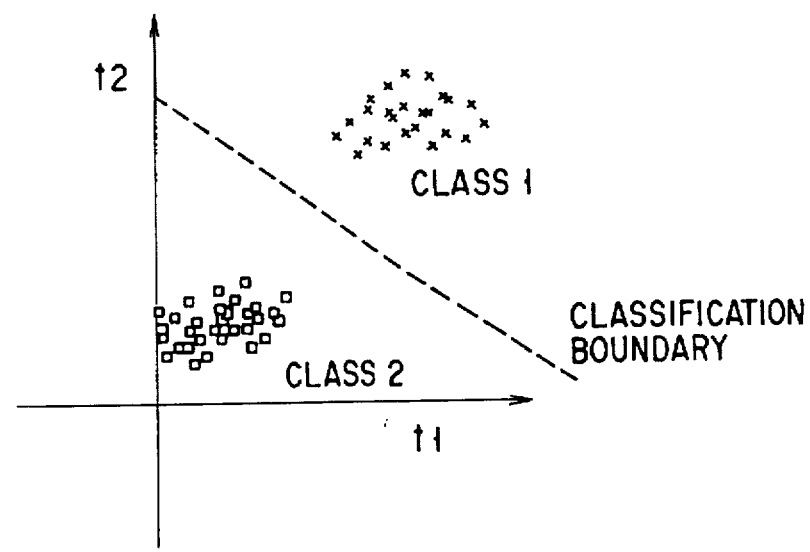
F I G. 38
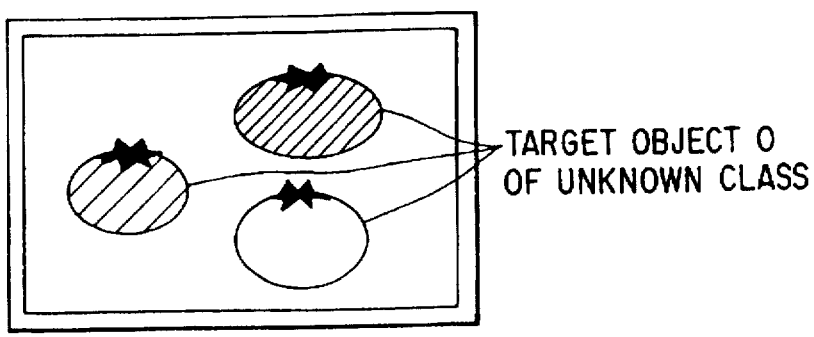
F I G. 39

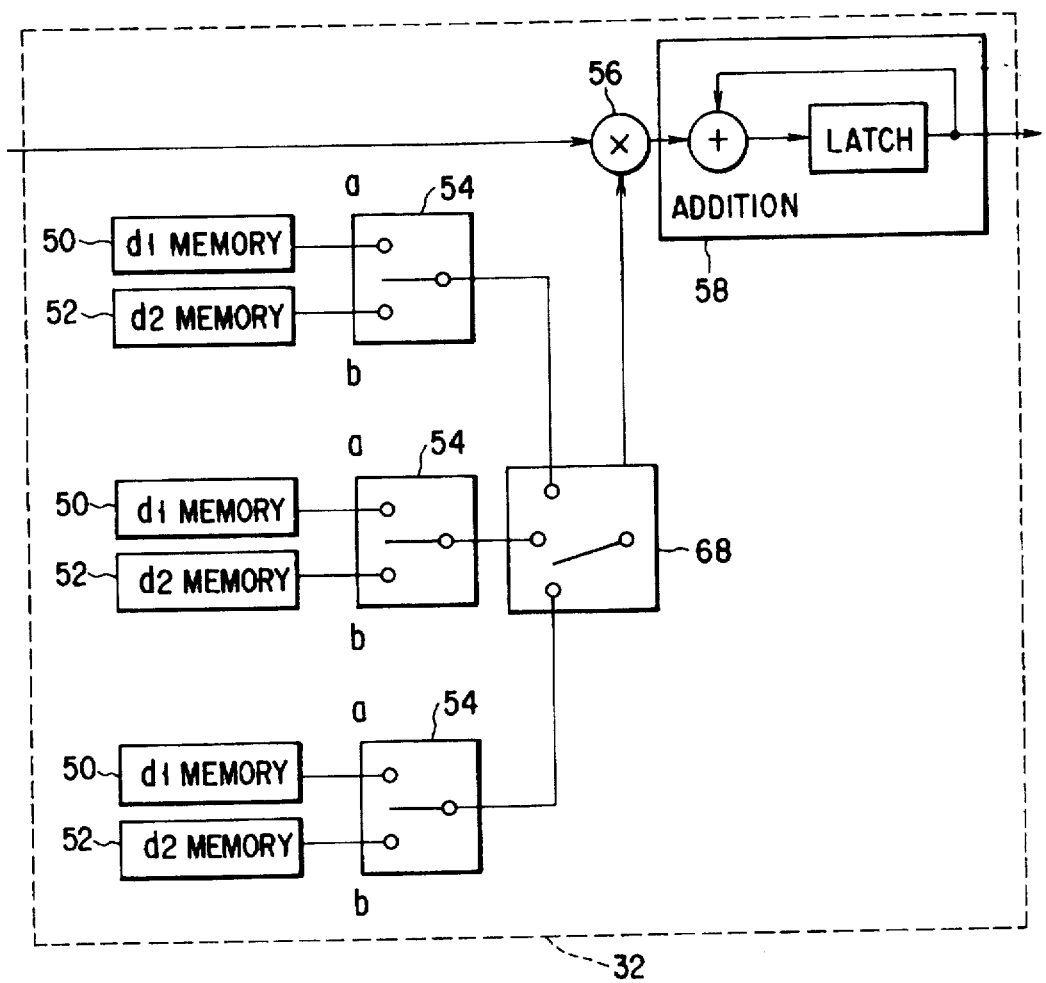
F I G. 42
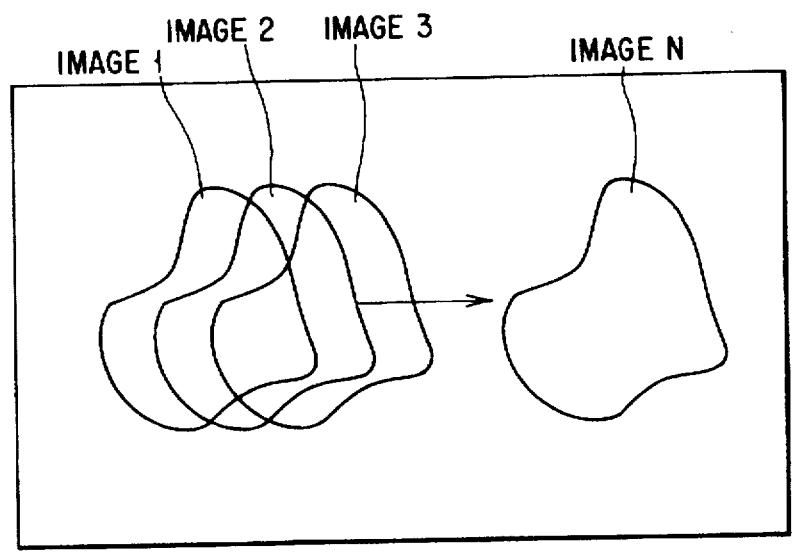
F I G. 43

COLOR CLASSIFICATION APPARATUS

BACKGROUND OF THE INVENTION

1. Field of the Invention

The present invention relates to a color classification apparatus and, more particularly, to a color classification apparatus for classifying, determining, or identifying target objects by using colors.

2. Description of the Related Art

Conventionally, color identification apparatuses for identifying the colors of target objects are utilized in management of painting colors and the dyeing degree or color measurement of products in various industrial production fields, color measurement of specimens in the medical and scientific fields, or the like.

For example, a color identification apparatus disclosed in U.S. Pat. No. 5,221,959 classifies target objects into two classes by statistically processing the reflection spectra of the target objects.

More specifically, the reflection spectrum of a target object of a known class is statistically processed using the Foley-Sammon transform (FS transform; see Q. Tian, M. Barbaro, et al., "Image classification by Foley-Sammon transform", Optical Engineering, Vol. 25, No. 7, 1986).

The FS transform is a method of classifying target objects into two classes, and more specifically is to obtain a spectrum di which maximizes a Fisher ratio R(di), by using the following equation based on S1 and S2 when two target objects are given:

$$R(di) = (di^t S1 di)/(di^t S2 di) \quad (1)$$

where
- di: classification spectrum
- $di^t$: classification spectrum (transpose)
- S1: between-class covariance matrix
- S2: intraclass covariance matrix The spectrum di for classification will be called a classification spectrum.

Since the classification spectrum di has the same number of dimensions as that of the target object, it should be accurately expressed by di($\lambda$). However, in this specification, the classification spectrum is expressed by di for the sake of simplicity.

The two types of classification spectra which increase the Fisher ratio are calculated.

In this case, a classification spectrum di which maximizes the Fisher ratio is defined as d1, and a classification spectrum di which maximizes the Fisher ratio in a spectrum perpendicular to d1 is defined as d2.

The two classes are obtained by projecting respective data in a space defined by the classification spectra d1 and d2.

The classification spectra d1 and d2 are calculated by the following equations:

$$d1 = a1 S2^{-1} \Delta, \quad (2)$$

$$d2 = a2 S2^{-1} \Delta [I - (\Delta^t S2^{-2} \Delta)/(\Delta^t S2^{-3} \Delta) S2^{-1}] \Delta (2)$$

where '1 and '2 are the normalization coefficients, $\Delta$ is X1−X2 (difference in spectrum between classes 1 and 2), and I is the unit matrix.

To project the respective data in the space defined by the classification spectra d1 and d2 obtained in this manner, the inner products of the classification spectra and the reflection spectrum of the target object are calculated.

If the reflection spectrum of the target object is defined as f($\lambda$) (where $\lambda$=wavelength), inner products t1 and t2 are expressed by the following equations:

$$t1 = f(\lambda) \cdot d1,$$

$$t2 = f(\lambda) \cdot d2$$

where the symbol "·" represents the inner product operation.

In the color identification apparatus disclosed in U.S. Pat. No. 5,221,959, the classification boundary is decided from the inner products t1 and t2, as shown in FIG. 38, and a filter having such classification spectral characteristics is realized by a diffraction grating G and a liquid crystal filter F, as shown in FIG. 40.

However, the classification spectra generally have complicated profiles, as shown in FIG. 41, and have positive and negative values. For this reason, a strict mounting precision is required for the diffraction grating G and the liquid crystal filter F.

If the mounting positions shift due to mechanical vibrations upon movement of the apparatus or the like, the classification precision greatly degrades.

In addition, the diffraction grating itself is very expensive.

For this reason, it is desired to realize a low-cost color classification apparatus which has a simple arrangement and stands mechanical vibrations and the like.

Further, since light sources are limited to some types (lamp L) in the color identification apparatus disclosed in U.S. Pat. No. 5,221,959, this apparatus is not suitable for classification for different light sources. When the spectrum of the light source changes, proper classification is difficult to perform.

Particularly when color classification is performed in a factory or the like, the light source can be limited to a specific one. However, it is desired to realize an apparatus which does not limit the type of light source and can properly perform color classification even when the spectrum changes.

For this purpose, the present applicant filed an application related to a low-cost color classification apparatus which has a simple arrangement, can stand mechanical vibrations and the like, further does not limit the type of light source, and can properly perform color classification even when the spectrum changes, as disclosed in U.S. Ser. No. 08/321,667.

More specifically, the color classification apparatus disclosed in U.S. Ser. No. 08/321,667 as the prior application is characterized by comprising an image pickup means for picking up an image of the reflection spectrum of a target object, a plurality of bandpass filters arranged between the target object and the image pickup means and having bands different from each other, and a classification means for calculating a classification spectrum for classification using a statistical method on the basis of the reflection spectrum of the target object whose image is picked up by the image pickup means, and classifying the target object using this classification spectrum.

In the color classification apparatus disclosed in U.S. Ser. No. 08/321,667 as the prior application, a plurality of bandpass filters having bands different from each other are prepared and respectively arranged between the target object and the image pickup means.

The classification spectrum for classification using the statistical method is calculated from the reflection spectrum of the target object whose image is picked up by the image pickup means, and the target object is classified using this classification spectrum.

First of all, the principle of the color classification apparatus disclosed in U.S. Ser. No. 08/321,667 as the prior application will be explained.

The color classification apparatus disclosed in U.S. Ser. No. 08/321,667 as the prior application uses a filter for classification, like the one shown in FIG. 33B or 33C, constituted by a combination of a plurality of bandpass filters which transmit only specific wavelengths as shown in FIG. 33A, in place of a diffraction grating and a liquid crystal filter in the conventional color identification apparatus disclosed in U.S. Pat. No. 5,221,959. With this filter, a color classification apparatus having a simple, low-cost arrangement is realized.

To perform color classification under different light sources, the color classification apparatus disclosed in U.S. Ser. No. 08/321,667 as the prior application measures the reflection spectrum of a proper reference plate, and corrects the reflection spectrum of a target object with the reflection spectrum of the reference plate, thereby eliminating the influence of the light source (illumination light).

That is, assume that $\lambda$ is the wavelength, $f(\lambda)$ is the reflection spectrum of the target object, $s(\lambda)$ is the reflection spectrum of the reference plate, $L(\lambda)$ is the reflection spectrum of the illumination light, and $M(\lambda)$ is the sensitivity spectrum of a photographing system (the transmission spectrum of a photographing lens, the sensitivity spectrum of a photographing element, or the like). A photographing spectrum $gi(\lambda)$ of the target object and a photographing spectrum $gs(\lambda)$ of the reference plate can be expressed by $$gi(\lambda)=f(\lambda)\times L(\lambda)\times M(\lambda)$$

$$gs(\lambda)=s(\lambda)\times L(\lambda)\times M(\lambda)$$

a spectrum $gi'(\lambda)$ of the target object can be expressed by $$gi'(\lambda)=gi(\lambda)/gs(\lambda)=f(\lambda)/s(\lambda) \quad (4)$$

In this manner, the influence of the reflection spectrum $L(\lambda)$ of the illumination light can be eliminated. By using $gi'(\lambda)$, classification can be performed under different light sources.

Further, when the illumination light has different luminances, the power of the signal $gi'(\lambda)$ upon removal is normalized.

Next, a color classification apparatus for classifying target objects into two classes, like the one disclosed in U.S. Ser. No. 08/321,667, will be described.

FIG. 32 is a view showing the arrangement. This color classification apparatus is constituted by an optical system 10 including the stop and the lens, a rotary color filter 12 constituted by a plurality of bandpass filters 12A, 12B, . . . , 12E as shown in FIG. 33B, a CCD 14 for capturing the images of a target object O and a reference plate R, an A/D converter 16, a frame memory 18, a monitor 20 for displaying a portion being photographed, a CCD driver 22, a drive motor 24 for the rotary color filter 12, a control unit 26 for controlling the CCD driver 22, the rotary color filter drive motor 24, and the like and for sending an instruction to a classification operation circuit 28, and the classification operation circuit 28 for performing classification.

The rotary color filter 12 is constituted by several types of bandpass filters 12A to 12E, as shown in FIG. 33B. Each filter has characteristics of transmitting an arbitrary bandwidth, as shown in FIG. 33A.

In this case, the rotary color filter 12 is constituted by five bandpass filters, for the sake of simplicity of drawing and description.

Note that the optical system 10 and the rotary color filter 12 may be reversely arranged, i.e., the rotary color filter 12 may be arranged before the optical system 10.

The classification operation circuit 28 is constituted by a luminance component extraction unit 30 for extracting the luminance component of the target object O, a classification operation unit 32 for performing a calculation (FS transform or the like) for classification, and a classification determination unit 34 for performing learning for classification determination, and classification determination, as shown in FIG. 34.

The luminance component extraction unit 30 has three measurement area extraction units 36A, 36B, and 36W for extracting the measurement areas of the photographed images of the target object O and the reference plate R, three luminance component averaging units 38A, 38B, and 38W for calculating the averages of measured luminance components, a luminance component memory "A" 40A in which the luminance component of photographed data of class 1 or an unknown class is written, a luminance component memory "B" 40B in which the luminance component of photographed data of class 2 is written, a luminance component memory "W" 40W in which the luminance component of data of the photographed reference plate R is written, a correction circuit 42 for correcting the influence of a light source, a luminance spectrum memory "$d_{ta}$" 44A in which the corrected data of class 1 or an unknown class is written, and a luminance spectrum memory "$d_{tb}$" 44B in which the corrected data of class 2 is written, as shown in FIG. 35.

The luminance component corresponding to the number (five in this case) of bandpass filters constituting the rotary color filter 12 can be written in the luminance component memories 40A, 40B, and 40W.

The correction circuit 42 is constituted by a divider $42_1$, as shown in FIG. 36A, or by the divider $42_1$ and a power normalization circuit $42_2$, as shown in FIG. 36B.

In the following description, the correction circuit 42 is assumed to be arranged as shown in FIG. 36B.

The luminance components (each luminance component consists of data corresponding to the number of filters) corresponding to the sample number N of data to be photographed can be written in the luminance spectrum memories 44A and 44B.

The classification operation unit 32 is constituted by a switch "A" 46, a classification spectrum calculation unit 48 for calculating the classification spectrum, a classification spectrum d1 memory 50 in which a classification spectrum d1 is written, a classification spectrum d2 memory 52 in which a classification spectrum d2 is written, a switch "B" 54, an integrator 56, an accumulation operation unit 58 constituted by an adder 58A and a latch 58B, as shown in FIG. 36C.

The classification determination unit 34 is constituted by a switch "C" 60, a classification boundary decision unit 62 for deciding the classification boundary, a classification boundary memory "c1" 64 in which the decided classification boundary is written, and a classification decision unit 66 for performing classification determination, as shown in FIG. 36C.

A process of classifying target objects into two classes by using the color classification apparatus having the above arrangement will be explained below.

In this process, a learning mode for obtaining the classification boundary is executed, and then a classification mode for performing color classification of data of an unknown class is performed.

First of all, the learning mode will be explained.

This learning mode is a mode for obtaining a classification spectrum for classifying target objects O into two classes, as shown in FIG. 37.

First, the control unit 26 adjusts the direction and focal length of the optical system 10 so as to simultaneously pick up the images of the target objects of two classes.

In-focus adjustment is performed by an in-focus adjustment mechanism (not shown), and photometry is performed using a photometer (not shown) to set the stop of the optical system 10 and the exposure time of the CCD 14.

Then, the position of the rotary color filter 12 is controlled to perform photographing by the first bandpass filter (e.g., 12A) of the rotary color filter 12.

A photographing instruction is sent to the CCD driver 22 to photograph the first images.

The image data captured by the CCD 14 and A/D-converted by the A/D converter 16 is transferred to the frame memory 18 and stored therein.

The image data stored in the frame memory 18 is read in the classification operation circuit 28.

In the classification operation circuit 28, the image data is first transferred to the luminance component extraction unit 30.

In the luminance component extraction unit 30, the measurement area extraction units 36A and 36B extract classification target areas corresponding to classes 1 and 2 from the captured respective image data of the respective images, and extract the luminance components of respective pixels.

The averages of the luminances in the respective areas detected by the luminance component averaging units 38A and 38B are written as data da1 and db1 in the luminance component memories 40A and 40B.

The rotary color filter 12 is rotated to photograph the second images by the second filter (e.g., 12B). The averages of the luminances in respective areas are written as data da2 and db2 in the luminance component memories 40A and 40B in the above-described manner.

This operation is performed up to the fifth filter (e.g., 12E). Data da3, da4, and da5 are written in the luminance component memory "A" 40A, and data db3, db4, and db5 are written in the luminance component memory "B" 40B.

That is, by the series of operations, data dai (i=1 to 5) are written in the luminance component memory "A" 40A, and data dbi (i=1 to 5) are written in the luminance component memory "B" 40B.

Then, the reference plate R is arranged near the target objects and photographed by the five types of filters in the above-described manner. Data dwi (i=1 to 5) are written in the luminance component memory "W" 40W.

The correction circuit 42 reads data of class 1 from the luminance component memory "A" 40A and the luminance component memory "W" 40W and data of class 2 from the luminance component memory "B" 40B and the luminance component memory "W" 40W, and corrects them.

In this correction, the divider $42_1$ divides data of each filter component in the luminance component memory "A" 40A by corresponding data in luminance component memory "W" 40W in accordance with the following equations:

$$da'^m i = da^m i / dwi \quad (i=1 \text{ to } 5, m=1 \text{ to } N)$$

$$db'^m i = db^m i / dwi \quad (i=1 \text{ to } 1, m=1 \text{ to } N) \quad (5a)$$

where $i$ is the filter number, and $m$ is the sample number.

By this calculation, the influences of different light sources (spectral characteristics) can be eliminated.

The power normalization circuit $42_2$ performs the following calculation with power values $Ca^m$ and $Cb^m$ so as to make the power values of the divided data constant:

$$da'''^m i = da'^m i / Ca^m \quad (i=1 \text{ to } 5, m=1 \text{ to } N)$$

$$db'''^m i = db'^m i / Cb^m \quad (i=1 \text{ to } 5, m=1 \text{ to } N) \quad (5b)$$

The power values $Ca^m$ and $Cb^m$ are expressed by $$Ca^m = \sum_{i=1}^{N} da'^m i, \quad (5c)$$

$$Cb^m = \sum_{i=1}^{N} db'^m i,$$

or $$Ca^m = \sum_{i=1}^{N} (da'^m i)^2, \quad (5d)$$

$$Cb^m = \sum_{i=1}^{N} (db'^m i)^2$$

By this power normalization, the influences of different luminances of the light source can be eliminated.

The $da'''^m i$ and $db'''^m i$ obtained in this manner are written as the luminance spectra in the luminance spectrum memories "$d_{ta}$" 44A and "$d_{tb}$" 44B.

At this time, as a sample of the target object, the target object itself may be exchanged, or a different area of the single target object may be used.

In this manner, luminance spectrum data corresponding to the sample number N of the target object are written in the luminance spectrum memories "$d_{ta}$" 44A and "$d_{tb}$" 44B.

When the target objects of two classes cannot be simultaneously photographed, a target object and the reference plate are photographed and corrected for each class, and the respective luminance spectra are written in the luminance spectrum memories "$d_{ta}$" 44A and "$d_{tb}$" 44B.

This operation is repeated by the number N of samples.

In the classification operation unit 32, the switch "A" 46 is switched to the b side.

The luminance spectrum data about classes 1 and 2 are respectively read out from the luminance spectrum memories "$d_{ta}$" 44A and "$d_{tb}$" 44B. The classification spectrum calculation unit 48 calculates classification spectra $d1_i$ (i=1 to 5) and $d2_i$ (i=1 to 5) perpendicular to $d1_i$ by using the above-mentioned FS transform. The classification spectra $d1_i$ and $d2_i$ are written in the classification spectrum $d1$ and $d2$ memories 50 and 52, respectively.

Then, the switch "A" 46 is switched to the a side, and the switch "C" 60 of the classification determination unit 34 is switched to the b side.

The switch "B" 54 is switched to the a side to read out the luminance spectrum data $da'''^m i$ from the luminance spectrum memory "$d_{ta}$" 44A and the classification spectrum data $d1_i$ from the classification spectrum $d1$ memory 50. The integrator 56 and the accumulation operation unit 58 calculate the inner product:

$$ta^m 1 = \sum_{i=1}^{5} (da'''^m i \times d1i) \quad (6)$$

The result is transferred to the classification boundary decision unit 62 of the classification determination unit 34.

Subsequently, the luminance spectrum data $db'''^m i$ is read out from the luminance spectrum memory "$d_{tb}$" 44B, and the classification spectrum data $d1_i$ is read out from the classification spectrum $d1$ memory 50 to calculate the inner product in the above-described manner:

$$tb^m 1 = \sum_{i=1}^{5} (db'''^m i \times d1i) \quad (7)$$

The result is transferred to the classification boundary decision unit 62.

Next, the switch "B" 54 is switched to the b side to read out the luminance spectrum data $da'''^m i$ from the luminance spectrum memory "$d_{ta}$" 44A and the classification spectrum data $d2_i$ from the classification spectrum d2 memory 52. The inner product is calculated as follows:

$$ta^m 2 = \sum_{i=1}^{5} (da^{m}i'' \times d21i) \qquad (8)$$

The result is transferred to the classification boundary decision unit 62.

Subsequently, the luminance spectrum data $db^m i''$ is read out from the luminance spectrum memory "$d_{tb}$" 44B, and the classification spectrum data $d2_i$ is read out from the classification spectrum d2 memory 52. The inner product is calculated as follows:

$$tb^m 2 = \sum_{i=1}^{5} (db^{m}i'' \times d2i) \qquad (9)$$

The result is transferred to the classification boundary decision unit 62.

This processing is repeated by the number of samples for each class.

The classification boundary is decided by the classification boundary decision unit 62 using the inner product values obtained in this manner, as shown in FIG. 38, and written in the classification boundary memory "c1" 64.

The leaning mode has been described.

Next, the classification mode will be described.

In the classification mode, first, target objects of an unknown class to be classified, like those shown in FIG. 39, are photographed similarly in the learning mode. Luminance spectra dxi (i=1 to 5) are written in the luminance component memory "A" 40A.

Subsequently, the reference plate R is similarly photographed under the same conditions. Luminance spectra dwi (i=1 to 5) are written in the luminance component memory "W" 40W.

Data are read from the luminance component memories "A" 40A and "W" 40W, and corrected by the correction circuit 42:

$$dxi' = dxi/dwi \qquad (10)$$

The power normalization circuit $42_2$ performs the following equation:

$$dxi'' = dxi'/Cx \qquad (i = 1 \text{ to } 5) \qquad (10)$$

$$Cx = \sum_{i=1}^{5} dxi'$$

so as to normalize the power values of the divided data. Spectra dxi'' are written in the luminance spectrum memory "$d_{ta}$" 44A.

The switch "A" 46 is switched to the a side in the classification operation unit 32, and the switch "C" 60 is switched to the a side in the classification determination unit 34.

The switch "B" 54 of the classification operation unit 32 is first switched to the a side to read out the luminance spectrum dxi'' from the luminance spectrum memory "$d_{ta}$" 44A and the classification spectrum data $d1_i$ from the classification spectrum d1 memory 50. The integrator 56 and the accumulation operation unit 58 calculate the inner product:

$$tx1 = \sum_{i=1}^{5} (dxi'' \times d1i) \qquad (11)$$

and tx1 is transferred to the classification decision unit 66 of the classification determination unit 34.

Next, the switch "B" 54 is switched to the b side to read out the luminance spectrum dxi'' from the luminance spectrum memory "$d_{ta}$" 44A and the classification spectrum data $d2_i$ from the classification spectrum d2 memory 52. The inner product is calculated as follows:

$$tx2 = \sum_{i=1}^{5} (dxi'' \times d2i) \qquad (12)$$

and tx2 is transferred to the classification decision unit 66.

The classification decision unit 66 reads out the classification boundary from the classification boundary memory "c1" 64, determines the locations of the inner product values tx1 and tx2 having transferred on either side with respect to the classification boundary, and outputs the classification result.

The above operation is performed in the classification mode.

As described above, in the color classification apparatus of the prior application, a difference in spectral characteristics of light sources is corrected by the divider $42_1$, and a difference in luminances is corrected by the power normalization circuit $42_2$. Therefore, even if different light sources are used, proper classification can be performed.

Since the power normalization circuit $42_2$ is further used, as shown in FIG. 36B, even when the luminance of the light source changes, proper classification can be performed.

Note that when the spectrum of the light source does not change, and only the luminance changes, the divider $42_1$ can be eliminated, and only the power normalization circuit $42_2$ is used.

In addition, since this color classification apparatus has a simple arrangement using only the rotary color filter 12, the cost can be reduced, and the resistance to mechanical vibrations and the like can be increased.

Since this color classification apparatus has the learning and classification modes, it can easily meet different classification purposes.

As shown in FIG. 42, a plurality of sets of a pair of classification spectrum d1 and d2 memories 50 and 52 for storing the classification spectra $d1_i$ and $d2_i$ having already learned, and the switches "B" 54 for selecting them are arranged in the classification operation unit 32. Different learned classification spectra are stored in the respective sets of classification spectrum d1 and d2 memories 50 and 52. A switch "C'" 68 for selecting one of the sets is used. With this arrangement, the color classification apparatus instantaneously meets different classification purposes.

In this case, the rotary color filter 12 has an arrangement in which the circular filters 12A to 12E are arranged on the same circle, as shown in FIG. 33B, and its position is controlled in units of the filters so as to stop the rotary color filter 12 at each filter. However, if the rotary color filter 12 having an arrangement in which the filters 12A to 12E are formed into an arcuated shape and arranged on the same circle is used, the rotary color filter 12 need not be stopped at each filter to perform position control, and can be kept moved. Therefore, classification processing can be performed at a higher speed.

In this case, the exposure timing of the CCD 14 must be synchronized with the rotation speed of the rotary color filter 12, as a matter of course.

The classification result may be displayed as images in different colors in accordance with the classified classes, or may be informed by voice or the like to the photographer.

In the color classification apparatus of the prior application described in U.S. Ser. No. 08/321,667, the color component of the target object is classified on the basis of multispectrum image data obtained by picking up the image of the target object via the rotary filter having a plurality of optical bandpass filters having pass band characteristics different from each other.

In this case, since the image of the target object is picked up upon rotation of the rotary filter, the image pickup times of the respective multispectral image data obtained are different from each other.

For example, as shown in FIG. 43, in the use of the color classification apparatus for the factory automation (FA) product inspection line or the like, when the image of a target object moving in one direction is to be picked up via the rotary filter having N optical bandpass filters, the image pickup positions of obtained images 1, 2, 3, ..., N shift in accordance with the movement of the target object.

If the above-described classification operation processing is directly performed for the data of the multispectral images obtained in this manner whose image pickup positions shift from each other, they are processed between pixels different from each other. Therefore, the color of the target object cannot be accurately classified.

That is, the color classification apparatus of the prior application described in U.S. Ser. No. 08/321,667 has room for an improvement so as to accurately classify the colors of the target objects even when the image pickup positions shift from each other.

SUMMARY OF THE INVENTION

The present invention has been made in consideration of the above situation, and has as its object to provide a color classification apparatus which can accurately classify the colors of target objects by performing a desired classification calculation on the basis of multispectral image data obtained by correcting a positional shift of a photographed image when the image pickup positional shifts.

To achieve the above object, according to the present invention, there is provided a color classification apparatus for classifying color components of a target objects, characterized by comprising an imaging optical system, an image pickup device arranged on an imaging plane of the imaging optical system, optical bandpass filters optically arranged upstream the image pickup device and having a plurality of different selectable optical transmission wavelength bands, transmission wavelength selection means for selecting one transmission wavelength band from the plurality of optical transmission wavelength bands, storage means each for storing each image information which has passed through the optical bandpass filter having the transmission wavelength band selected by the transmission wavelength selection means and is picked up by the image pickup device, and transmission wavelength band information selected by the transmission wavelength selection means in correspondence with each other, read means for performing read access to an area corresponding to the target object in each image information from the storage means, and correction means for correcting, in accordance with a positional shift of each image information of the target object which is stored in the storage means, the area of each image information to be read by the read means.

In addition, according to the present invention, there is provided a color classification apparatus characterized in that the correction means corrects the area of each image information to be read by the read means on the basis of a timing of selecting the transmission wavelength band of the optical bandpass filter by the transmission wavelength selection means and a moving speed of the target object.

Further, according to the present invention, there is provided a color classification apparatus characterized by further comprising target object convey means for conveying the target object at a constant speed, timing generation means for generating an exposure timing of the image pickup device, and synchronism control means for controlling the selection means so as to perform selection of the optical bandpass filter in synchronism with the timing of the timing generation means, so that the correction means calculates a moving distance of the target object during a period between exposure timings generated by the timing generation means, by using a convey speed of the target object by the target object convey means, and corrects the area in each image information to be read by the read means by using the obtained moving distance.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the inventions.

FIG. 3 is a view for explaining the operation of the positional shift correction unit in the first embodiment of the present invention;

FIG. 4 is a timing chart for explaining the operation of the positional shift correction unit in the first embodiment of the present invention;

FIG. 5 is a view for explaining the operation of a modification of the positional shift correction unit in the first embodiment of the present invention;

FIGS. 6A and 6B are views, respectively, for explaining positional shifts in the second embodiment of the present invention;

FIGS. 12A, 12B, and 12C are a view showing the schematic arrangement of the fifth embodiment according to the present invention, and views for explaining the operation of a positional shift correction unit thereof, respectively;

FIG. 13 is a view showing the schematic arrangement of the positional shift correction unit in the fifth embodiment of the present invention;

FIG. 14 is a view showing the schematic arrangement of a modification of the positional shift correction unit in the fifth embodiment of the present invention;

FIG. 15 is a view showing the schematic arrangement of a positional shift correction unit in the sixth embodiment of the present invention;

FIG. 16 is a view for explaining a monitor area in the sixth embodiment of the present invention;

FIGS. 17A, 17B, and 17C are views showing the schematic arrangements, respectively, of an image position detection unit in the sixth embodiment of the present invention;

FIG. 21 is a view showing the schematic arrangement of a positional shift correction unit in the eighth embodiment of the present invention;

FIG. 30 is a view showing the schematic arrangement of the 12th embodiment according to the present invention;

FIGS. 36A and 36B are views showing the arrangements, respectively, of a correction circuit in FIG. 35;

FIG. 36C is a view showing the arrangements of a classification operation unit and a classification determination unit in FIG. 35;

FIG. 37 is a view showing target objects of two classes;

FIG. 38 is a graph showing a classification boundary decided in a learning mode by the color classification apparatus according to the prior application;

FIG. 39 is a view showing target objects of an unknown class to be classified;

FIG. 42 is a view showing the arrangement of a classification operation unit; and FIG. 43 is a view for explaining the subject of the present invention.

DETAILED DESCRIPTION OF THE PREFERRED EMBODIMENTS

Figure 1:
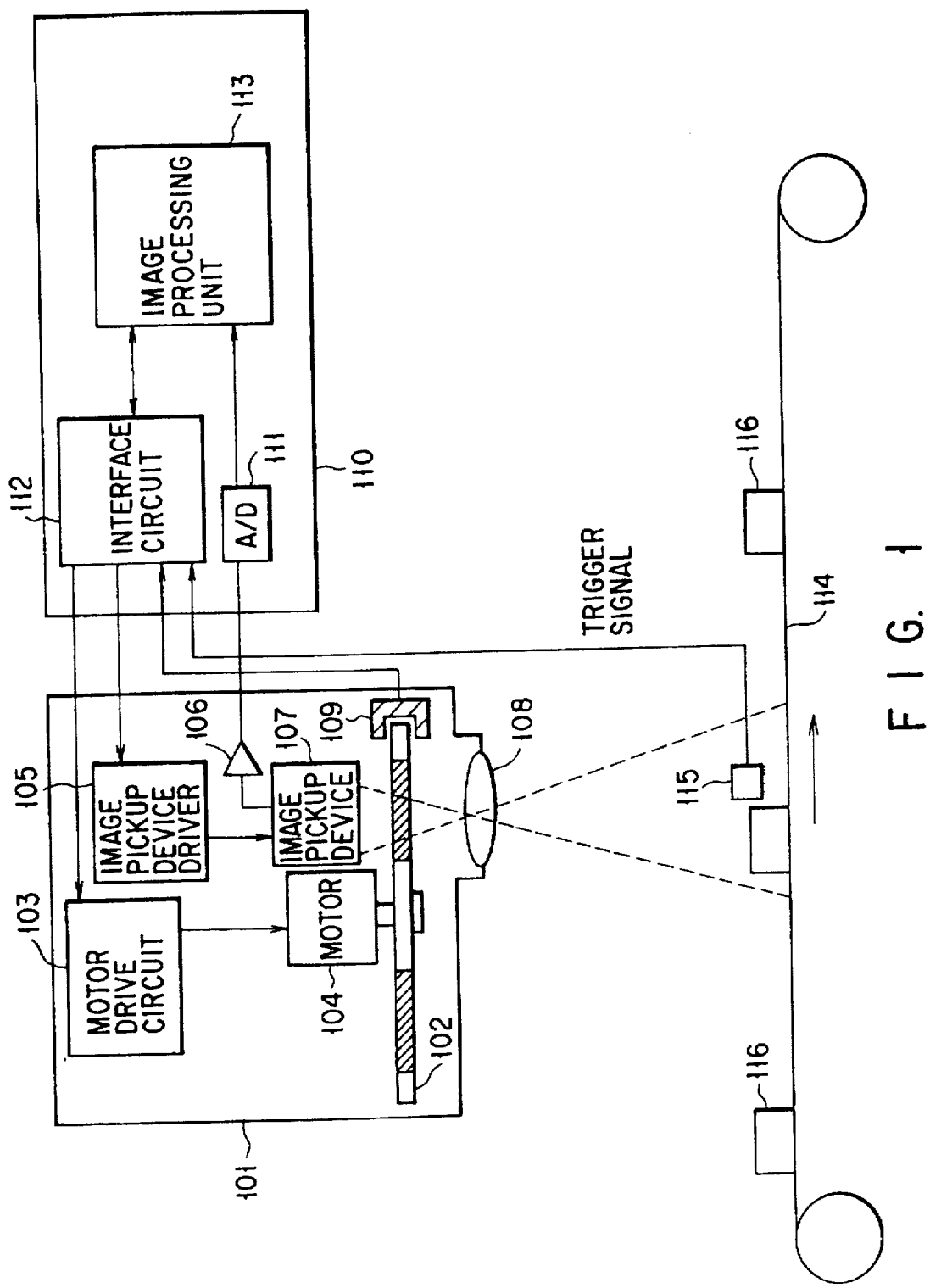
FIG. 1 is a view showing the schematic arrangement of the first embodiment according to the present invention.

Reference will now be made in detail to the presently preferred embodiments of the invention as illustrated in the accompanying drawings, in which like reference characters designate like or corresponding parts throughout the several drawings.

Embodiments of a color classification apparatus according to the present invention will be described below with reference to the accompanying drawings.

(First Embodiment)

First, an application to a convey unit which moves at a constant speed will be described as the first embodiment.

(Arrangement)

As shown in FIG. 1, three- or two-dimensional target objects (to be referred to as objects to be photographed) 116 are conveyed at predetermined intervals (which are not always equal) on a convey unit 114 moving at a constant speed, e.g., on a belt conveyor in the FA line.

The color classification apparatus of the first embodiment is mainly constituted by an image input unit 101 having a rotary filter 102 and an image pickup device 107, and a control unit 110 such as a personal computer.

A position detection sensor 115 such as a photoelectrical switch or a proximity switch is arranged above the convey unit 114 moving at a constant speed, e.g., on the belt conveyor.

When a certain object 116 comes to a predetermined position, the position detection sensor 115 detects it and outputs a trigger signal to an interface circuit 112 in the control unit 110.

The rotary filter 102 in the control unit 110 comprises a plurality (N) of bandpass filters having different pass bands, like the one in the prior application described above. The rotary filter 102 is driven and rotated at a constant speed by a motor 104 controlled by a motor drive circuit 103.

A filter position detection unit 109 arranged on the rotation path of the rotary filter 102 to oppose the rotary filter 102 monitors the current filter on the photographing position opposite to a lens 108 serving as an imaging optical system, and sends a filter position signal to the interface circuit 112 in the control unit 110.

Note that the rotation speed and the like of the rotary filter 102 are controlled by the motor drive circuit 103 via the interface circuit 112 in the control unit 110.

The image pickup device 107 in the image input unit 101 is a CCD solid-state image pickup device. An image pickup device driver 105 reads an image signal and sets the speed of an electronic shutter via the interface circuit 112 in the control unit 110.

An image signal as the image information of the object 116 photographed by the image pickup device 107 via each filter of the rotary filter 102 is sent to an analog/digital (A/D) converter 111 in the control unit 110 via an amplifier 106.

In the control unit 110, an image processing unit 113 performs predetermined processing (to be described later) via the interface circuit 112 and the analog/digital (A/D) converter 111.

Figure 2:
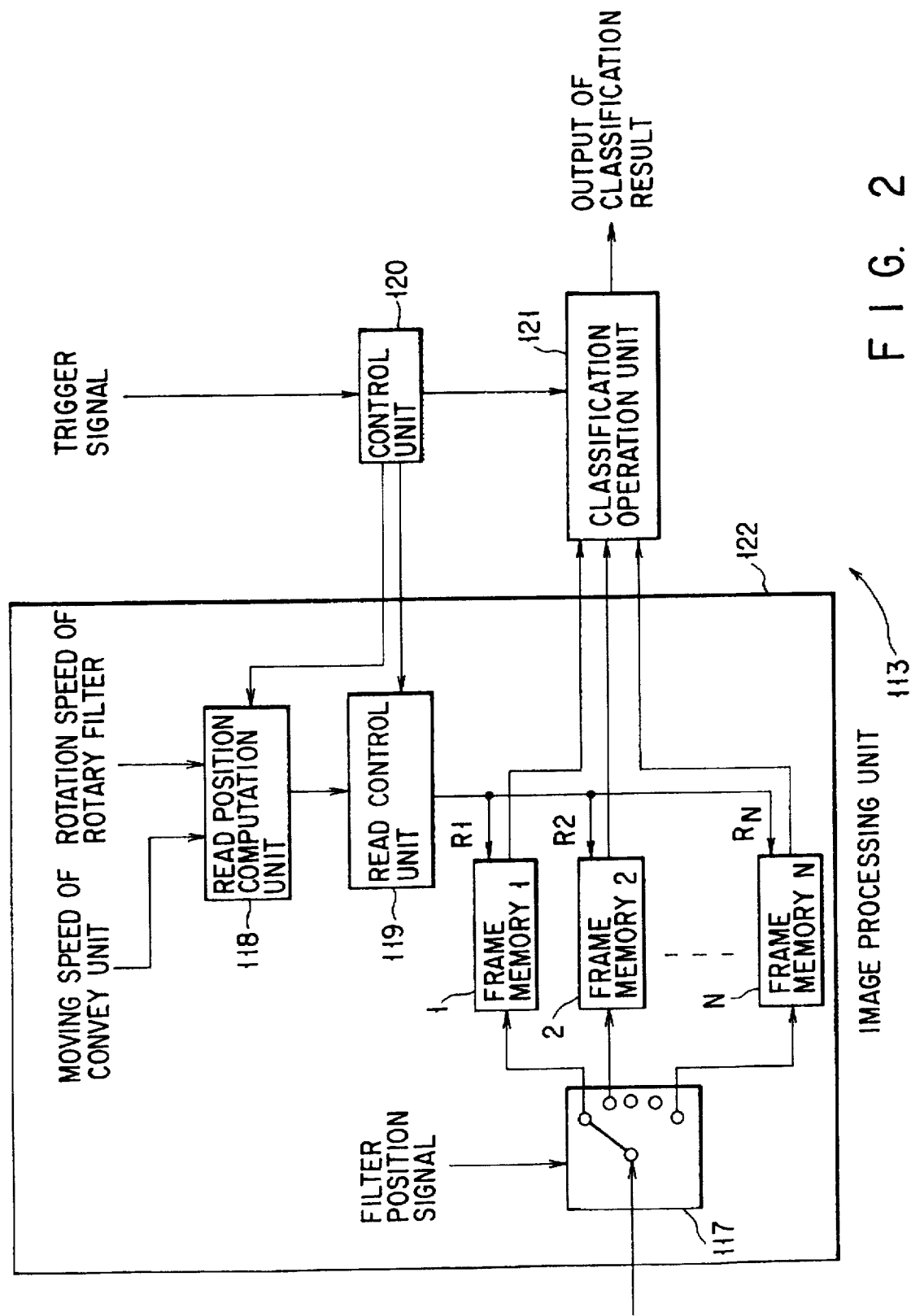
FIG. 2 is a view showing the schematic arrangement of a positional shift correction unit in the first embodiment of the present invention.

As shown in FIG. 2, a positional shift correction unit 122 arranged in the image processing unit 113 of the control unit 110 has N frame memories 1, 2, ..., N for storing the A/D-converted signals of images photographed via the respective filters of the rotary filter 102.

In the image processing unit 113 of the control unit 110, the image data sent via the analog/digital (A/D) converter 111 is stored in the frame memory 1, 2, ..., N having the same numbers as the filter position numbers of the respective filters of the rotary filter 102 via a switch 117 which is switched on the basis of the filter position signal sent via the interface circuit 112.

In the image processing unit 113 of the control unit 110, a read control unit 119 controls the read positions of the frame memories 1, 2, ..., N on the basis of outputs from a read position computation unit 118 (to be described later).

In this case, the read position computation unit 118 calculates a predetermined read position required to correct a positional shift of the photographing position (to be described later) on the basis of the moving speed of the convey unit 114 and the rotation speed of the rotary filter 102 in FIG. 1.

With this processing, read addresses of the respective frame memories 1, 2, ..., N are changed for a classification operation unit 121 so as to correct the positional shifts of the photographing positions, as shown in FIG. 3.

That is, as shown in FIG. 3, a predetermined area (read area in FIG. 3) larger than the object 116 is read out from a read start position $R_1$ of the frame memory 1.

In the similar manner, a predetermined area is read out from a read start position $R_2$ of the frame memory 2, and a predetermined area is read out from a read start position $R_N$ of the frame memory N.

The read start positions $R_1$, $R_2$, ..., $R_N$ are positions separated from each other by an equal interval because the convey unit 114 moves at a constant speed. The read start positions $R_1$, $R_2$, ..., $R_N$ are calculated in advance by the read position computation unit 118 on the basis of the moving speed of the convey unit 114 and the rotation speed of the rotary filter 102.

In FIG. 2, the control unit 120 outputs predetermined control signals to the read position computation unit 118, the read control unit 119, and the classification operation unit 121 on the basis of the above trigger signal sent from the position detection sensor 115 via the interface circuit 112 in the control unit 110.

(Operation)

The convey unit 114 in FIG. 1 starts to convey the object 116, and when the object 116 comes to a position immediately before the position detection sensor 115, the position detection sensor 115 generates a trigger signal.

At this time, the rotary filter 102 in the control unit 110 is continuously rotated. Immediately after supply of the trigger signal, the first image is picked up at a timing at which a filter i moves to the image pickup position.

At this time, since the filter position detection unit 109 sends a filter position signal corresponding to the filter number i to the switch 117, the image signal is stored in a frame memory i.

Subsequently, when a filter i+1 is rotated and moved to the image pickup position, the second image is picked up, and the image signal is stored in a frame memory i+1.

This processing is performed up to a filter i−1 to complete photographing of N images and storage of the respective image signals.

Next, the image signals are read from the read start positions $R_1$, $R_2$, ..., $R_N$ of the respective frame memories 1, 2, ..., N which are calculated in advance by the read position computation unit 118 and sent via the read control unit 119 so as to correct positional shifts. These image signals are sent to the classification operation unit 121.

With this processing, the classification operation unit 121 performs a desired classification calculation between the same pixels without any positional shift, and outputs the classification result.

Note that since the classification calculation in the classification operation unit 121 is the same as that in the prior application described above, a description thereof will be omitted, and the above description is directly incorporated herein.

(Effect)

According to the first embodiment as described above, since the read position of each frame memory is set on the basis of the moving speed of the convey unit and the rotation speed of the rotary filter, a positional shift upon movement of the object can be properly corrected.

In addition, according to the first embodiment, since the color classification apparatus comprises the switch for switching the frame memories in response to the filter position signal from the filter position detection unit of the rotary filter, an image signal immediately after generation of a trigger signal can be written in a predetermined frame memory, and the processing speed can be increased.

According to the first embodiment, the read area of the object is set larger than the object, as shown in FIG. 3. Therefore, even when a time interval between generation of the trigger signal and capture of the image varies, the image of the object can be reliably picked up.

Note that in the first embodiment, the calculation processing area in the classification operation unit can be set smaller than the object, as shown in FIG. 5.

(Second Embodiment)

A case wherein a positional shift due to the mounting error of the rotary filter in the first embodiment described above is corrected together with the positional shift of the photographing position will be described below as the second embodiment.

Note that the following respective embodiments have the same arrangement as that in the first embodiment as described above. The same reference numerals or related numerals denote parts having the same functions, and a description or drawing thereof will be properly omitted.

First of all, the positional shift due to the mounting error of the rotary filter, which is the problem in the second embodiment, will be explained. As shown in FIG. 6A, if disks 102A and 102B mounted with filters 1 and 2 equivalent to the rotary filter 102 shown in FIG. 1 do not rotate within a plane perpendicular to the optical axis, the imaging positions shift in accordance with filters 1 and 2.

That is, in the case as shown in FIG. 6A, images are formed at P1 for filter 1 and at P2 for filter 2 to cause positional shifts by Δ1 and Δ2 with respect to an original imaging position P0.

Even if the disk 102 of filter 1 is perpendicular to the optical axis, as shown in FIG. 6B, filter 1 itself may not be mounted perpendicular to the optical axis.

That is, also in the case as shown in FIG. 6B, the positional shift Δ1 similarly occurs.

The positional shift amounts Δ1 and Δ2 are fixed values for the respective filters.

Figure 7:
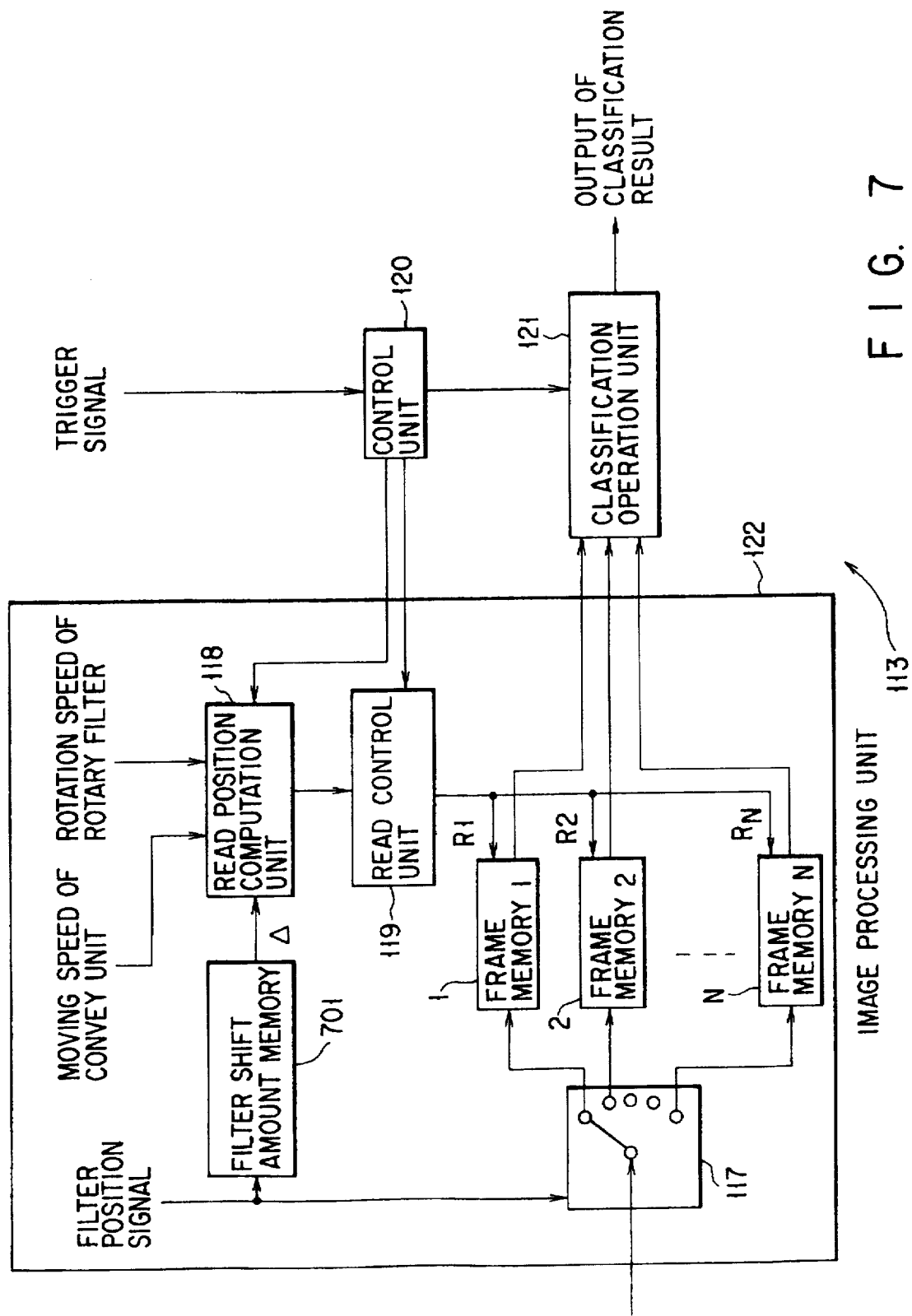
FIG. 7 is a view showing the schematic arrangement of a positional shift correction unit in the second embodiment of the present invention.

In the second embodiment, the shift amount is measured in advance and stored in a filter shift amount memory 701 newly arranged in a positional shift correction unit 122 of an image processing unit 113 in a control unit 110, as shown in FIG. 7.

In photographing, the positional shift amount Δ is read out from the filter shift amount memory 701 in accordance with the above-mentioned filter position signal. A read position computation unit 118 calculates a read address so as to also correct this positional shift amount Δ.

Note that the second embodiment employs the arrangement shown in FIG. 1 without any modification. The arrangement shown in FIG. 7 is different from the that in FIG. 2 in that the positional shift amount Δ is read from the filter shift amount memory 701 in accordance with the filter position signal, and the read position computation unit 118 calculates the read address so as to also correct Δ, as described above.

In general, when the apparatus is manufactured at low cost, the above-described filter mounting error occurs. However, according to the second embodiment, this shift can be properly corrected.

(Third Embodiment)

A case utilizing a block read operation using a CMD (Charge Modulation Device) in place of the above-mentioned image pickup device in the first embodiment will be described below as the third embodiment.

Figure 8:
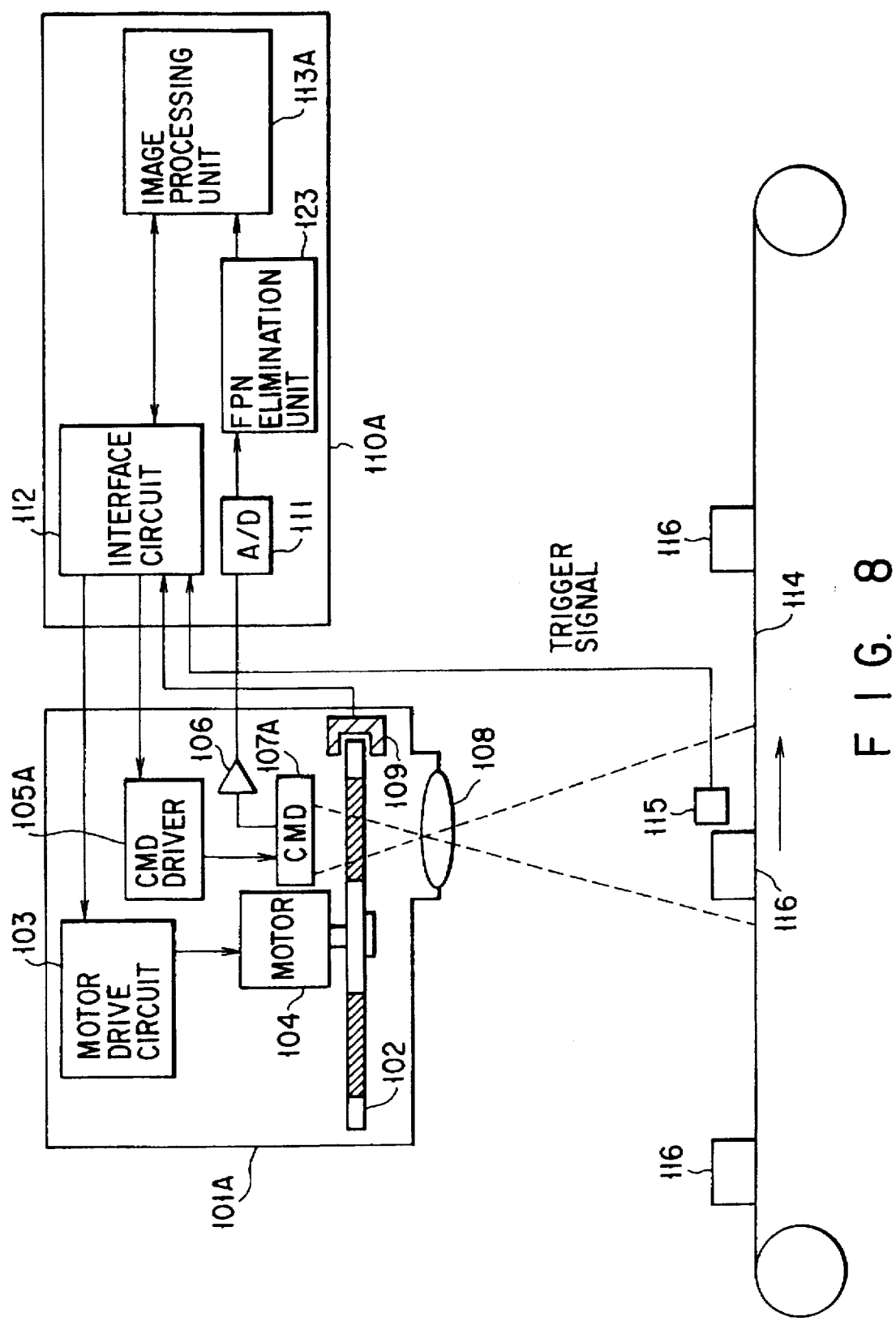
FIG. 8 is a view showing the schematic arrangement of the third embodiment according to the present invention.

More specifically, as shown in FIG. 8, the third embodiment uses a CMD 107A and a CMD driver 105A, in place of the above-mentioned image pickup device 107 and the image pickup device driver 105 in the first embodiment, respectively.

The CMD is an image pickup device of an amplification type X-Y address scheme. An image block corresponding to an arbitrary number of pixels can also be read from an arbitrary position in the image pickup device.

In the third embodiment, the read position can be directly changed in the image pickup device of the CMD 107A, instead of changing the read positions of the frame memories 1, 2, ..., N, which is performed in the first embodiment.

Figure 9:
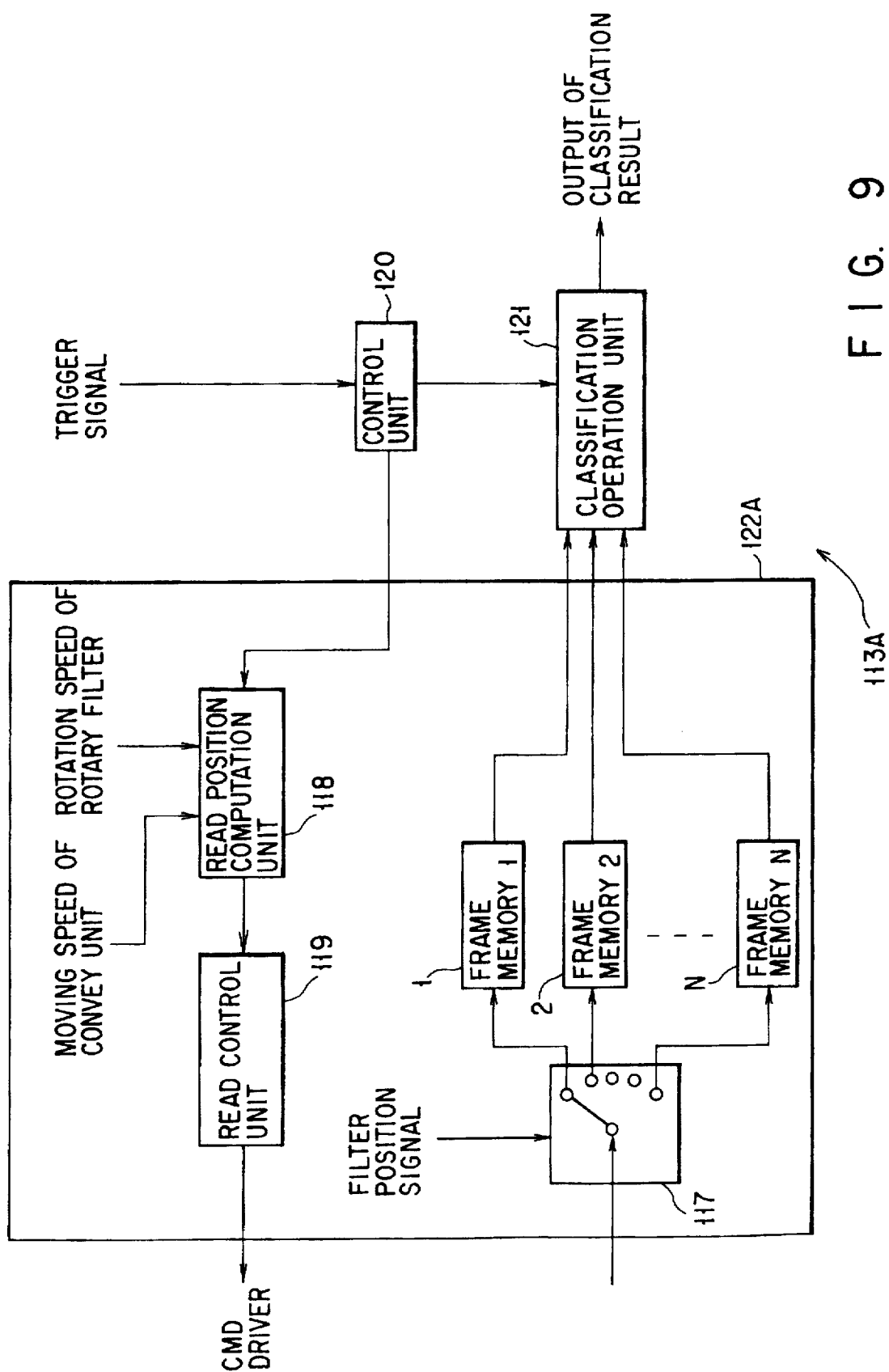
FIG. 9 is a view showing the schematic arrangement of a positional shift correction unit in the third embodiment of the present invention.

More specifically, in a positional shift correction unit 122A of an image processing unit 113 in a control unit 110, a read control unit 119 controls the read position of the CMD 107A via the CMD driver 105A in FIG. 8 on the basis of the above-mentioned output from a read position computation unit 118, as shown in FIG. 9.

The third embodiment has the following effects.

First, since all the pixels need not be read, a read operation can be performed at a higher speed, and the moving speed of the convey unit can be further increased.

The capacity of each of the frame memories 1, 2, ..., N can be reduced to a capacity equivalent to the read area (see FIG. 5) in the first embodiment.

The third embodiment, however, has a problem unique to the CMD. That is, in the CMD 107A used in place of the above-mentioned image pickup device 107 in the first embodiment, variations in amplification appear as fixed pattern noise (FPN) in units of pixels.

In FIG. 8, therefore, of a plurality (N) of bandpass filters having different pass bands, which are provided to a rotary filter 102 of an image input unit 101A, at least one is used as a dark-time image signal input filter having a transmittance of 0.

In addition, as shown in FIG. 8, an FPN elimination unit 123 is newly arranged between an analog/digital (A/D) converter 111 and the image processing unit 113 in a control unit 110A.

In the FPN elimination unit 123, the signal of an image picked up at a dark time via the dark-time image signal input filter having a transmittance of 0 is subtracted from the signal of an image picked up via each filter other than the above filter, thereby eliminating the FPN.

(Fourth Embodiment)

A case utilizing a tunable filter in place of the above-mentioned rotary filter in the first embodiment will be described below as the fourth embodiment.

Figure 10:
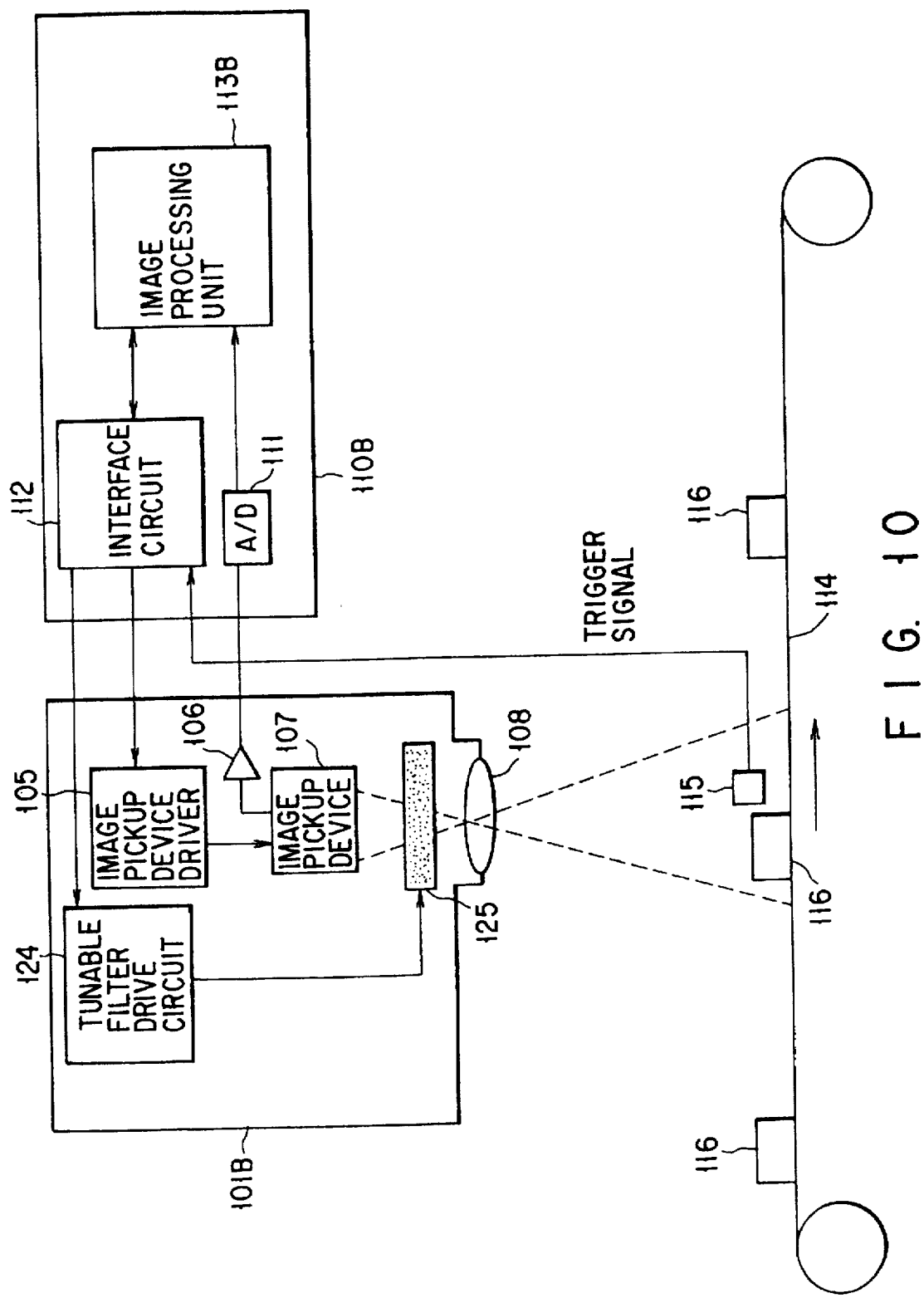
FIG. 10 is a view showing the schematic arrangement of the fourth embodiment according to the present invention.
Figure 11:
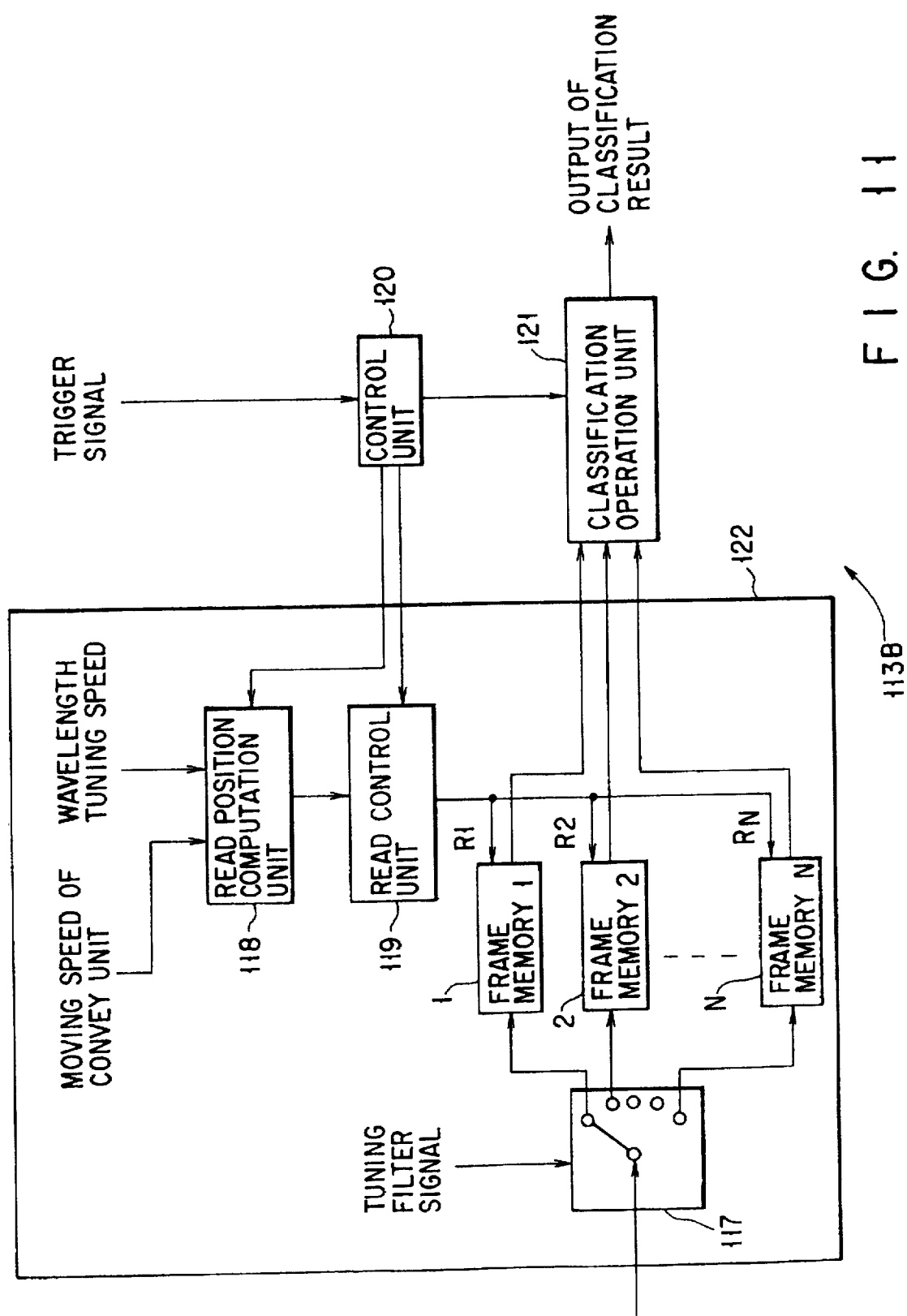
FIG. 11 is a view showing the schematic arrangement of a positional shift correction unit in the fourth embodiment of the present invention.

More specifically, as shown in FIGS. 10 and 11, the fourth embodiment uses a tunable filter 125 in place of the above-described rotary filter 102 in the first embodiment.

The transmission wavelength of the tunable filter 125 is electrically controlled by a tunable filter drive circuit 124 used in place of the above-described motor drive circuit 103 in the first embodiment.

Note that to tune the wavelength of the tunable filter 125 requires several ms to several tens ms, which is an important factor in calculating the read position by a read position computation unit 118.

For this reason, in an image processing unit 113B, the wavelength tuning speed is input to the read position computation unit 118, instead of inputting the rotation speed of the rotary filter in the first embodiment.

In addition, a tuning filter signal is input to a switch 117, instead of the above-mentioned filter position signal in the first embodiment.

The fourth embodiment has the following effects.

First, since a mechanical drive unit like the above-mentioned rotary filter in the first embodiment is not used, a compact, lightweight image input unit can be attained.

Since the photographing transmission wavelength can be electrically controlled, the photographing transmission wavelength can be easily, arbitrarily selected.

That is, the pass band and number of filters must be optimized every time the object to be measured is changed. As for the above-mentioned rotary filter 102 in the first embodiment, the filter itself must be exchanged. As for the tunable filter in the fourth embodiment, only the wavelength to be tuned is changed, and the filter can be easily optimized for different objects.

Further, if a tunable filter covering the visible area is used, the object color can be converted into a measured color value with a high precision.

(Fifth Embodiment)

A case wherein striped filters are arranged before the image pickup device in the first embodiment will be described below as the fifth embodiment.

More specifically, in the fifth embodiment, striped filters A, B, C, D, and E are arranged immediately before an image pickup device 107B, as shown in FIG. 12A, in place of the above-mentioned rotary filter 102 in the first embodiment or the above-mentioned wavelength variable (tunable) filter 125 in the fourth embodiment.

Note that FIG. 12A shows five types of striped filters, i.e., the color filters A, B, C, D, and E for the sake of descriptive convenience, but the number is not limited to five.

The sizes of the respective color filters A, B, C, D, and E are assumed to be equal.

FIG. 12B shows the image pickup state in the fifth embodiment.

That is, areas A, B, C, D, and E in FIG. 12B represent areas whose images are picked up by the respective color filters A, B, C, D, and E.

First of all, at time T1, a trigger is generated to photograph an object 116A.

In this case, the size of the object 116A is assumed to be smaller than each area A, B, C, D, or E. For this reason, the object 116A is present in only the area A. Only an image signal from the area A is stored in the above-described manner in a frame memory 126 in a positional shift correction unit 122C, like the one shown in FIG. 13.

In next photographing at time T2 after a predetermined time, the object 116A is present in only the area B. Only an image signal from the area B is stored in the frame memory 126 in the positional shift correction unit 122C, like the one shown in FIG. 13.

Image signals from the areas C, D, and E are sequentially stored in the same manner in the frame memory 126 in the positional shift correction unit 122C, like the one shown in FIG. 13.

According to the fifth embodiment, since only one frame memory suffices, and the above-described rotary filter unit in the first embodiment is not used, a compact, lightweight color classification apparatus can be attained.

Note that, in the fifth embodiment, a trigger signal is generated only when the object 116A comes to the area A. However, if trigger signals are generated for the respective areas A, B, C, D, and E by using a plurality of above-described position detection sensors 115 in the first embodiment, a proper classification calculation can be performed even when the speed of the above-described convey unit 114 in the first embodiment is not constant.

(Modification)

The above embodiment assumes that the object 116A is smaller than the respective areas A, B, C, D, and E. In the case of a sheet-like object 116B or a large number of objects, as shown in FIG. 12C, a positional shift correction unit 122D, like the one shown in FIG. 14, is employed in place of the positional shift correction unit 122C, like the one shown in FIG. 13.

More specifically, in the positional shift correction unit 122D shown in FIG. 14, the signals of images picked up at respective photographing times, shown in FIG. 12C, are selectively written in frame memories 1, 2, . . . , 5.

Corresponding areas are read out from the respective frame memories 1, 2, . . . , 5.

That is, in the case of FIG. 12C, respective image signals of the areas A, B, C, D, and E are respectively read out from the frame memories 1, 2, 3, 4, and 5, sent to a classification operation unit 121, and processed, as shown in FIG. 14.

After a predetermined time, respective image signals of the areas E, A, B, C, and D are respectively read out from the frame memories 1, 2, 3, 4, and 5, sent to the classification operation unit 121, and processed.

The classification results calculated for the respective areas A, B, C, D, and E in this manner are synthesized by a result synthesis unit 127, and displayed on a monitor 129 or the like via a monitor signal generation unit 128.

According to the modification of the fifth embodiment, a classification calculation can be properly performed for a sheet-like continuous object (printed matter, a film, and the like) moving at a high speed.

(Sixth Embodiment)

A case wherein the above-described trigger signal in the first embodiment is obtained from an image signal, instead of being obtained from the position detection sensor will be described below as the sixth embodiment.

The sixth embodiment uses a monitor area, like the one shown in FIG. 16, in the image signal.

An image position detection unit 131 calculates the average of this monitor area on the basis of the image signal from a frame memory 130 in the image processing unit, like the one shown in FIG. 15.

In this case, in the image position detection unit 131, a comparison unit 134 compares the average of the monitor area calculated by an average calculation unit 132 with the average, calculated by a background average calculation unit 133, of a convey unit 114 itself serving as the background of the image. When the comparison result indicates that the two averages are different by a predetermined value or more, the image is determined as an object, and a trigger signal is generated.

Note that the background average calculation unit 133 may calculate the averages of backgrounds in advance, store them for respective filters, and read out them in correspondence with the respective filters in a measurement operation.

In addition, as shown in FIG. 17B, the image position detection unit 131 may extract an edge signal with an edge extraction unit 135, and when a determination unit 136 determines that the edge signal reaches a predetermined value or more, generate a trigger signal.

Further, as shown in FIG. 17C, the image position detection unit 131 may extract a specific pattern of, e.g., a printed character, a stamp, or a handwritten character with a specific pattern extraction unit 137, and when a determination unit 138 determines that the specific pattern extraction signal reaches a predetermined value or more, generate a trigger signal.

In the cases of FIGS. 17B and 17C, the average of the background need not be stored for each filter, unlike in the case of FIG. 17A.

Although not shown, a difference between the image signals of the respective filters may be calculated to detect the motion.

According to the sixth embodiment, since the position detection sensor is eliminated, the arrangement of the convey unit can be simplified. At the same time, a very small object, which is difficult to be detected by the position detection sensor, can be detected.

Note that the sixth embodiment described above may be used for trigger detection in the third to fifth embodiments described above.

(Modification)

Figure 20:
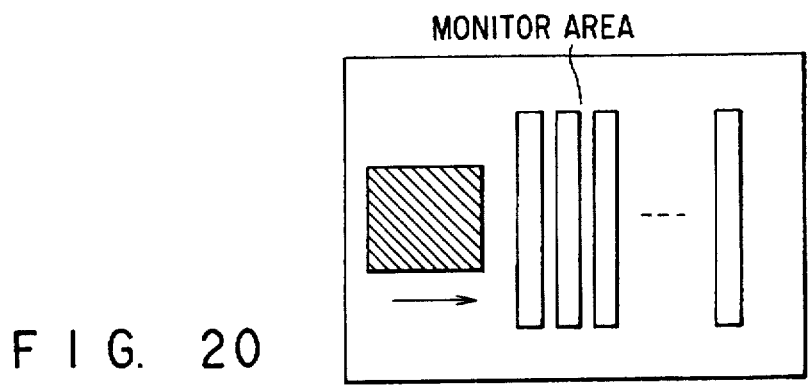
FIG. 20 is a view for explaining the monitor area in a modification of the sixth embodiment of the present invention.

Although one monitor area is set in the sixth embodiment, a plurality of monitor areas may be set, as shown in FIG. 20.

According to the modification of the sixth embodiment, the cost can be reduced, compared to a case using a plurality of position detection sensors, as in the seventh embodiment (to be described below).

(Seventh Embodiment)

A case wherein the above-described convey unit in the first embodiment is not moved at a constant speed will described below as the seventh embodiment.

When the convey unit is not moved at a constant speed in the first embodiment described above, a positional shift cannot be properly corrected only by reading image signals from the read start positions $R_1, R_2, \ldots$ calculated in advance.

Figure 18:
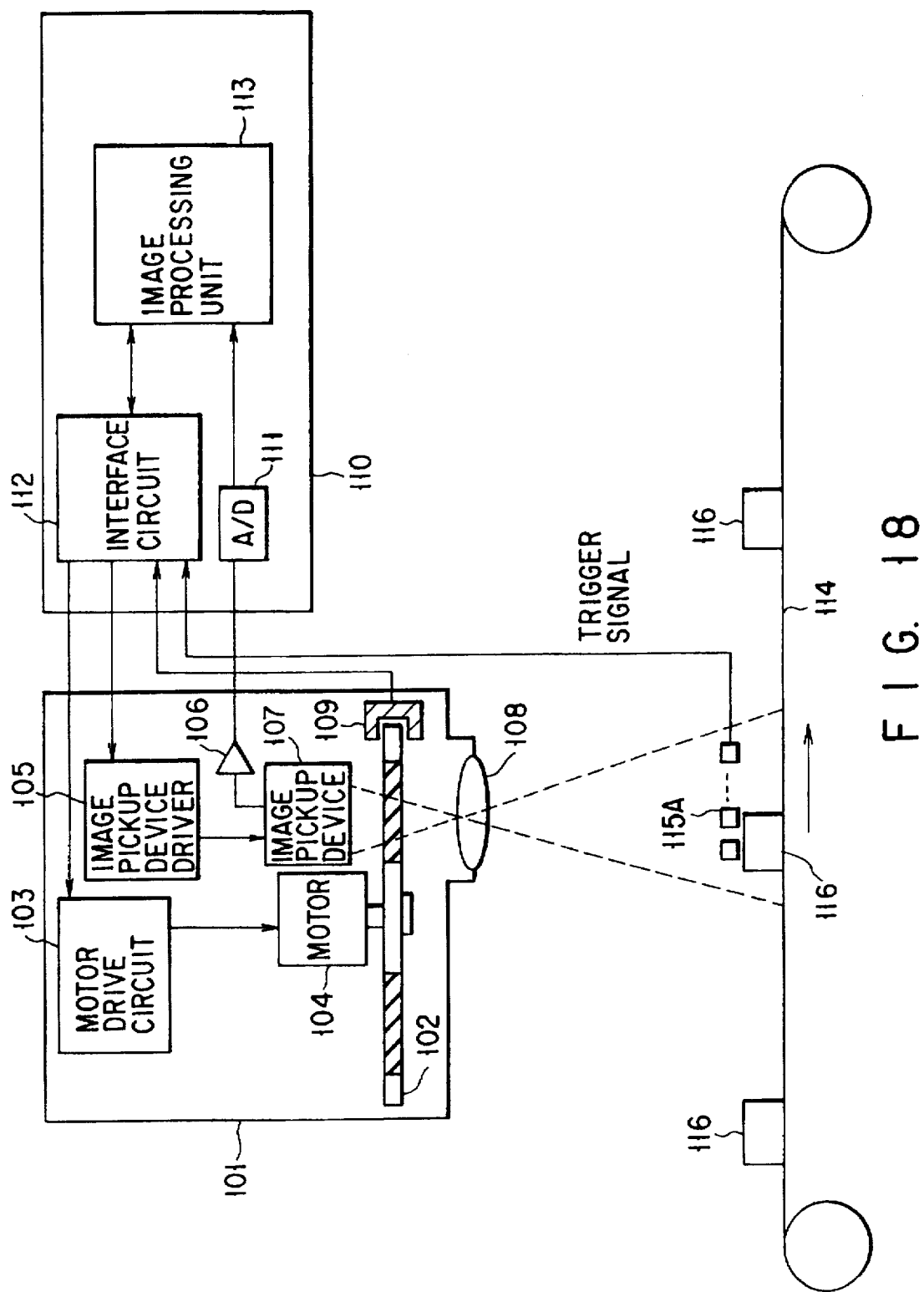
FIG. 18 is a view showing the schematic arrangement of the seventh embodiment according to the present invention.

In the seventh embodiment, therefore, a plurality of position detection sensors 115A corresponding to the number of filters in the rotary filter 102 are arranged, as shown in FIG. 18.

Note that the seventh embodiment assumes that the rotary filter 102 is intermittently driven.

Figure 19:
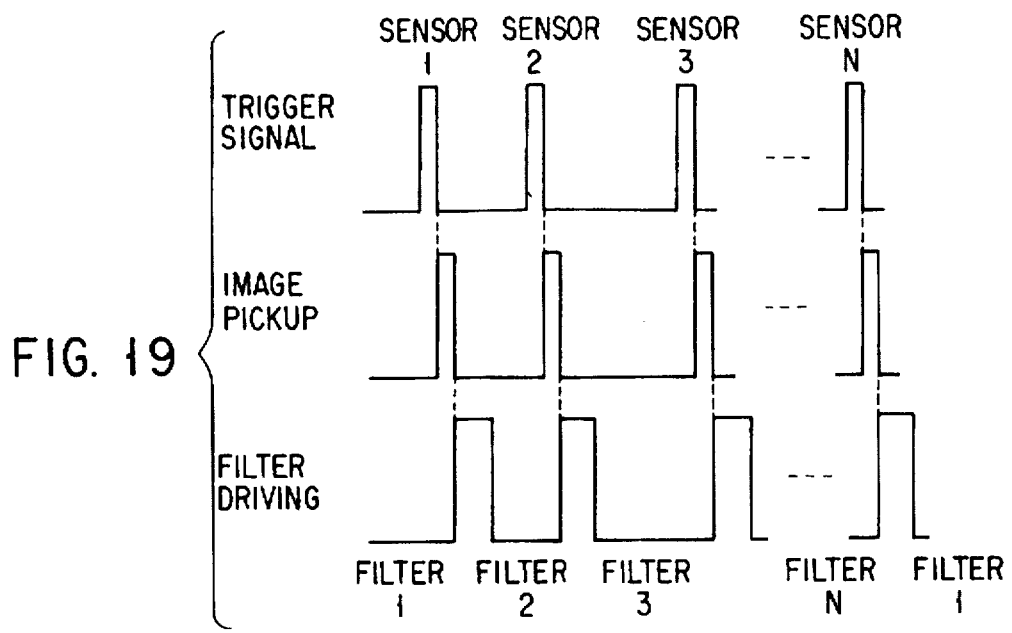
FIG. 19 is a timing chart for explaining the operation of a positional shift correction unit in the seventh embodiment of the present invention.

As shown in FIG. 19, when an image is picked up immediately after generation of a trigger signal, the rotary filter 102 is changed to a next photographing filter immediately after the image pickup operation.

That is, the above embodiments assume that the convey unit moves at a constant speed. However, the seventh embodiment copes with the case wherein the convey unit moves at a nonconstant speed.

The seventh embodiment is different from the first embodiment in that a plurality of position detection sensors 115A are employed, as shown in FIG. 18. In this case, if the rotary filter 102 has N filters, the number of the position detection sensors 115A is also N, i.e., sensors 1, 2, ..., N shown in FIG. 19.

The position detection sensors 115A are located in correspondence with respective image pickup positions.

FIG. 19 shows image pickup timings.

First, when an object 116 comes, a trigger signal is output. At this timing, a trigger signal for picking up an image by the sensor 1 is output.

Next, a trigger signal for picking up an image by the sensor 2 is output at this timing.

At this time, if the objects 116 move at a nonconstant speed, an interval between the objects 116, i.e., a time interval between the image pickup timings are different.

When a trigger signal is to be output from the sensor 1, the filter of the rotary filter 102 is set as filter 1 in advance.

In this case, since a convey unit 114 moves at a nonconstant speed if the rotary filter 102 moves at a constant speed, the photographing timing is not matched. In this case, the rotary filter 102 is assumed to be intermittently driven.

First, a trigger signal is output from sensor 1, the exposure timing of an image pickup device 107 via filter 1 of the rotary filter 102 is controlled to pick up an image immediately.

Upon completion of exposure, the filter of the rotary filter 102 is switched from filter 1 to filter 2.

An image pickup operation progresses in the similar manner such that filter 2 of the rotary filter 102 is set and then a trigger signal is output from next sensor 2.

In this case, however, if the drive timing of the rotary filter 102 is too late, the next trigger is generated. Therefore, the exposure timing must be set in advance so as to have a predetermined interval.

For this reason, the speed of the convey unit 114 must be normally set lower.

Note that it can also be possible to photograph the object while monitoring the speed of the convey unit, or triggering the sensor upon determining that the convey unit moves by a predetermined distance by providing patterns to the convey unit at a constant interval and counting the number of patterns.

With this setting, although the first sensor is required, a plurality of sensors can be eliminated, and only one sensor is used.

According to the seventh embodiment, even when the convey unit moves at a nonconstant speed, a positional shift can be reliably corrected.

(Eighth Embodiment)

A case wherein the convey unit in the first embodiment moves at a nonconstant speed will be described below as the eighth embodiment.

As shown in FIG. 21, when the convey unit 114 shown in FIG. 1 moves at a nonconstant speed, the signals of images having picked up for respective filters are read out from frame memories 1, 2, ..., N, and the correlation is calculated by a correlation operation circuit 139 to detect positional shifts in photographing.

A read control unit 119D changes a read address on the basis of this result.

Figure 22:
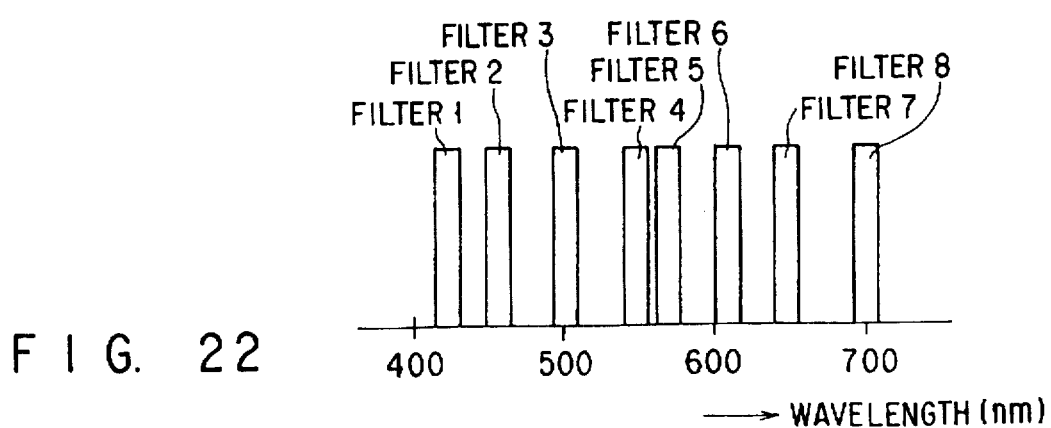
FIG. 22 is a view for explaining a filter arrangement in the eighth embodiment of the present invention.

In calculating the correlation by the correlation operation circuit 139, the correlation is low between images via filters having transmission wavelengths greatly different from each other. For this reason, rotary filters 1, 2, 3, 4, 5, 6, 7, and 8 are arranged to consecutively order their transmission wavelengths, as shown in FIG. 22 (in the case of eight filters).

Figure 23:
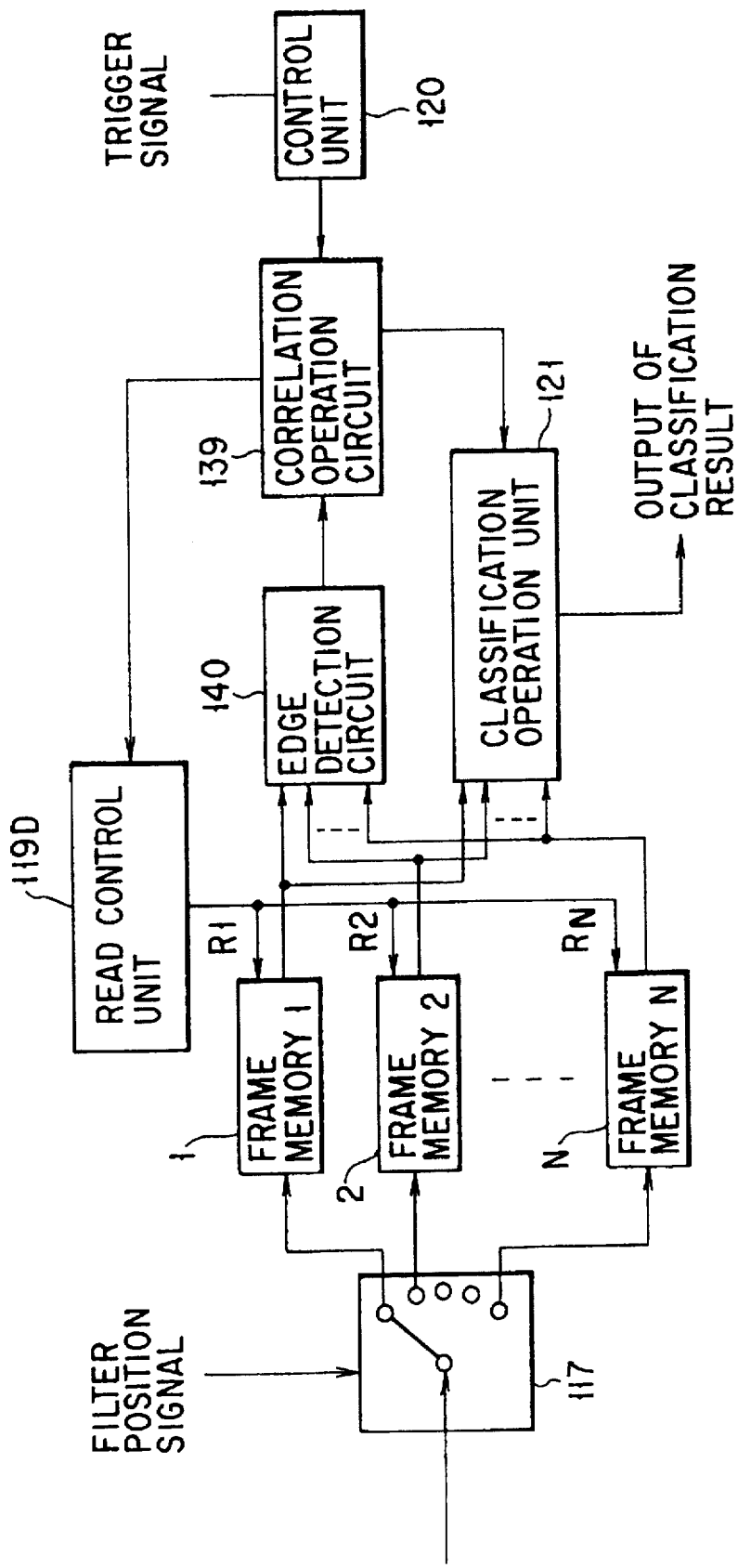
FIG. 23 is a view showing the schematic arrangement of a modification of the positional shift correction unit in the eighth embodiment of the present invention.

Further, to increase the correlation, the correlation may be calculated by the correlation operation circuit 139 upon detecting an edge by an edge detection circuit 140, as shown in FIG. 23.

Note that, a specific pattern (e.g., a cross mark or a predetermined character) may be formed on the object to detect a positional shift from this specific pattern.

According to the eighth embodiment, the position detection sensor can be eliminated.

(Ninth Embodiment)

A case wherein the object does not translate in the first embodiment will be described below as the ninth embodiment.

Figures 25A, 25B:
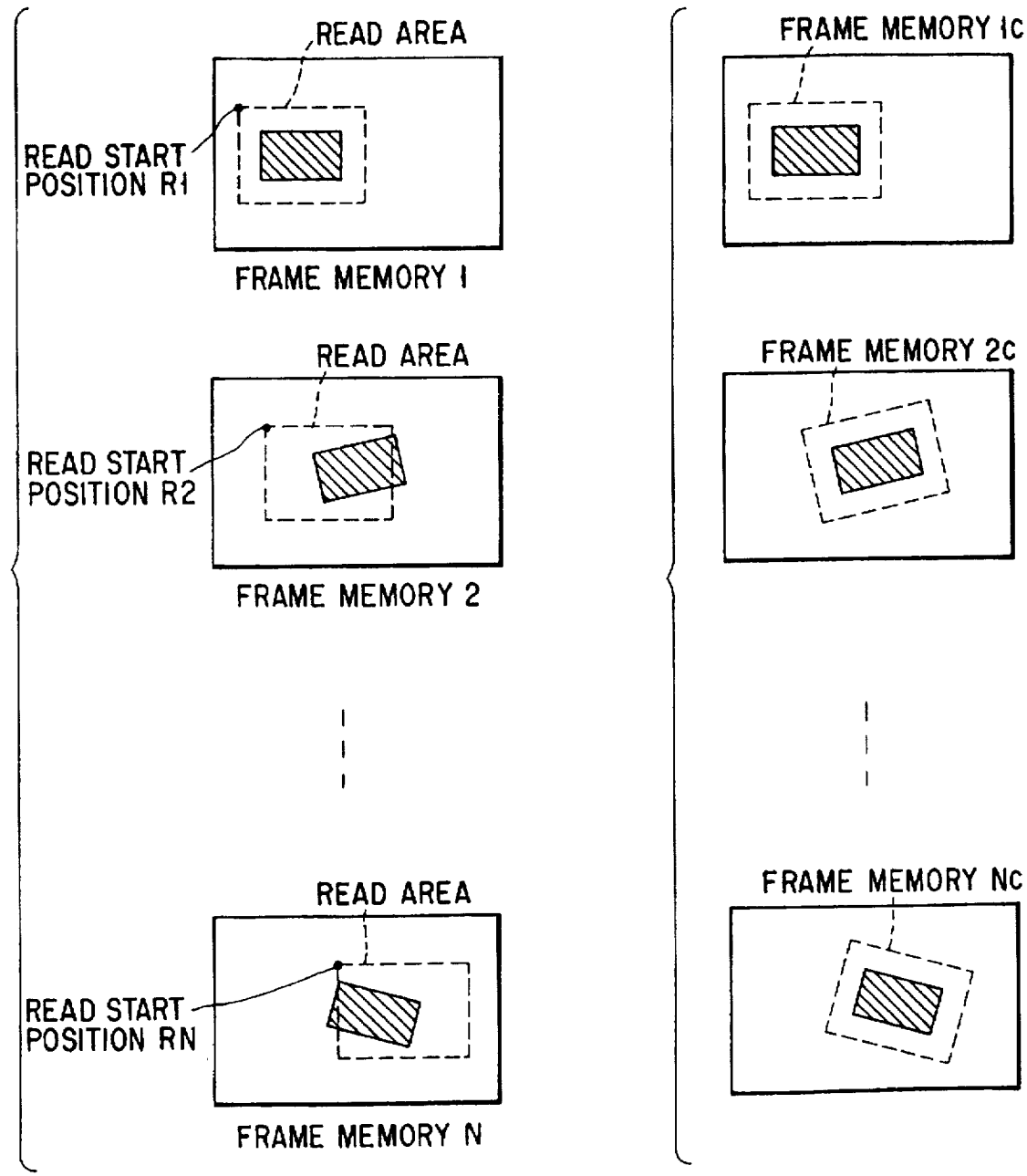
FIGS. 25A and 25B are views, respectively, for explaining the operation of the positional shift correction unit in the ninth embodiment of the present invention.

When the convey unit 114 shown in FIG. 1 is a belt conveyor or the like, the object may rotate due to vibrations, as shown in FIG. 25A.

In this case, a positional shift cannot be completely corrected only by correcting translation, unlike in the first embodiment.

Figure 24:
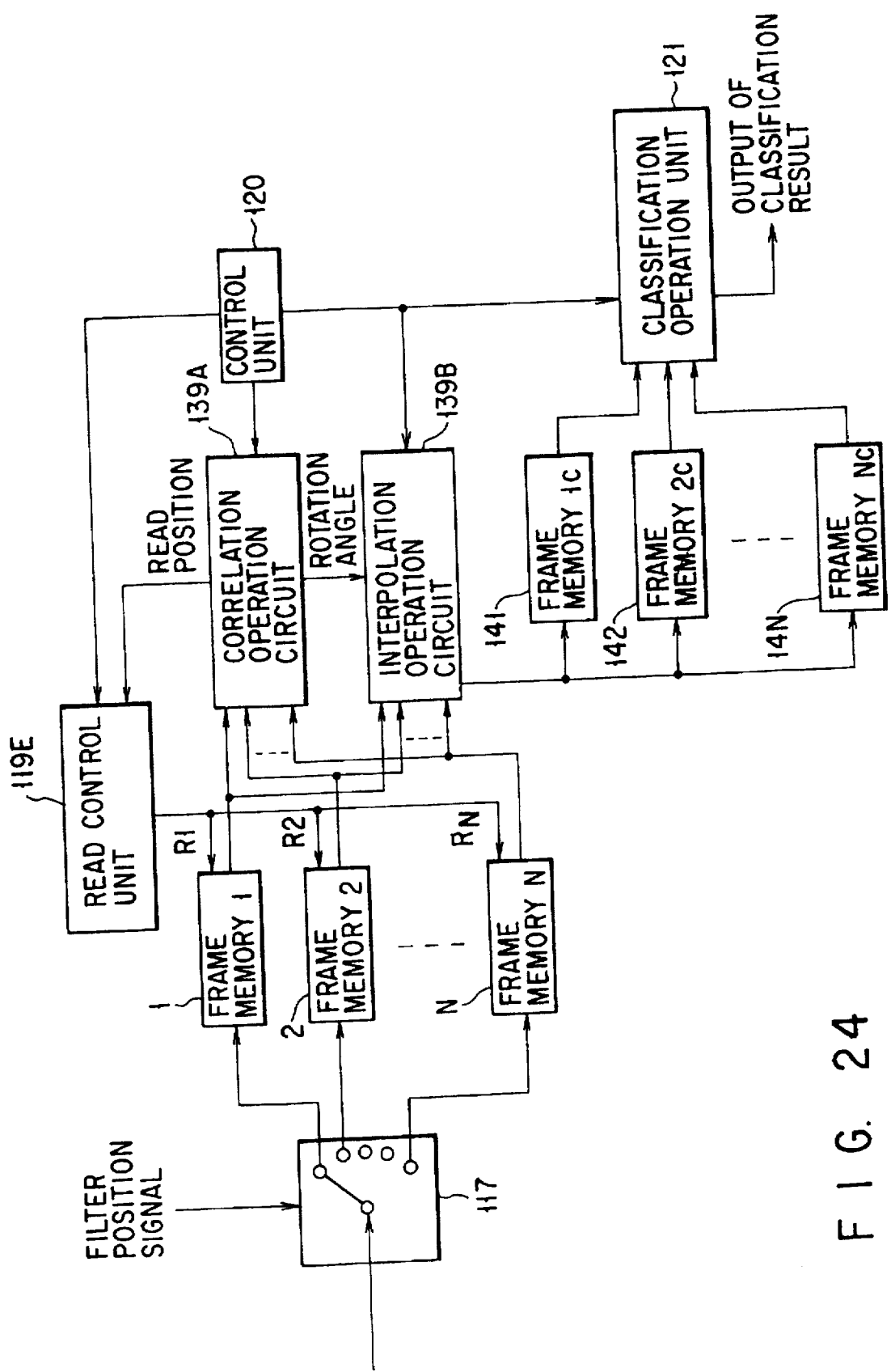
FIG. 24 is a view showing the schematic arrangement of a positional shift correction unit in the ninth embodiment of the present invention.

In the ninth embodiment, as shown in FIG. 24, a correlation operation circuit 139A and an interpolation operation circuit 139B are used to detect not only the translation amount of an object 116 but also its rotation movement amount by a method like the one disclosed in Jpn. Pat. Appln. KOKAI Publication No. 6-14126, thereby correcting a positional shift.

FIG. 25B shows images corrected by an interpolation calculation.

More specifically, the ninth embodiment copes with the case wherein the object 116 moves at a nonconstant speed and further rotates and shifts due to vibrations of the convey unit 114 such as a belt conveyor, or the like.

In this case, not only the translation amount of the object 116 but also its rotation amount are obtained by a correlation calculation, and at the same time, the rotation angle is obtained.

To calculate the rotation amount of the object 116 in addition to its translation amount, a correlation calculation must be performed at not one portion but a plurality of portions in the correlation operation circuit 139A.

That is, the translation amount, rotation amount, and rotation angle of the object 116 can be obtained by calculating the correlation at two or more portions in the correlation operation circuit 139A.

An image is rearranged to correctly order the image by the interpolation calculation of the interpolation operation circuit 139B on the basis of the rotation angle obtained by the correlation operation circuit 139A and the read position, and is stored in frame memories $14_1$, $14_2$, ..., $14_N$.

The following processing is the same as that described in the first embodiment.

According to the ninth embodiment, it can be avoided that the object 116 falls out of the read area upon rotation, as shown in FIG. 25A, which occurs if the read addresses are sequentially shifted from the read start positions $R_1, R_2, \ldots, R_N$ on the assumption that the object 116 normally translates.

That is, in the ninth embodiment, when the object 116 rotates, the read position and read direction of the frame memory 1, 2, ..., N are rotated or translated upon rotation of the object 116, as shown in FIG. 25B. With this processing, read images always move similarly.

(10th Embodiment)

A case using a line sensor in place of an area sensor as an image pickup device in the first embodiment will be described below as the 10th embodiment.

Figure 26:
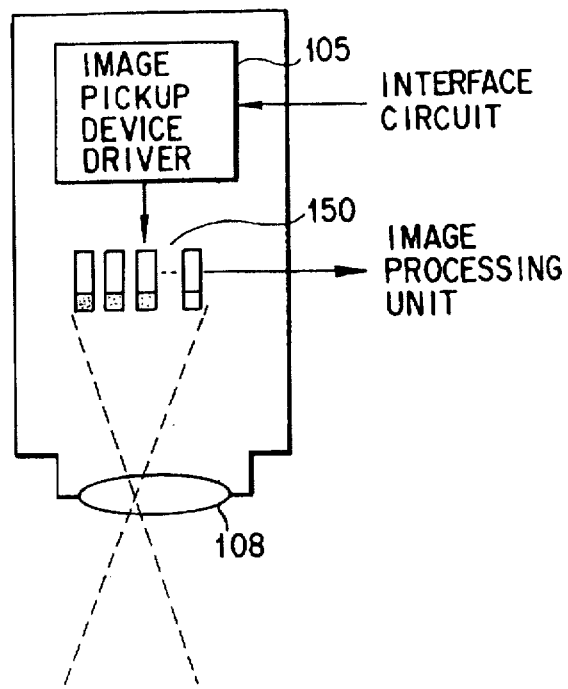
FIG. 26 is a view showing the schematic arrangement of the 10th embodiment according to the present invention.

More specifically, in the 10th embodiment, a plurality of line sensors 150 are used, as shown in FIG. 26. A plurality of bandpass filters 150a having different pass wavelength bands are arranged immediately before the respective line sensors 150.

An image processing unit has the same arrangement as that in the first embodiment. The read position depends on only an interval between the arranged line sensors 150.

According to the 10th embodiment, since the read position is fixed, the read position need not be changed upon a change in speed of the convey unit. In addition, an image can picked up with a high resolution of, e.g., 1,000×1,000 pixels or more at low cost by using the line sensors, instead of using an expensive area sensor.

(11th Embodiment)

Control of the rotation speed of the rotary filter and the exposure time of the image pickup device in the first embodiment will be described below as the 11th embodiment.

If the rotation speed of the rotary filter increases, a so-called eclipse occurs, and an image cannot be correctly picked up.

Figures 27A, 27B:
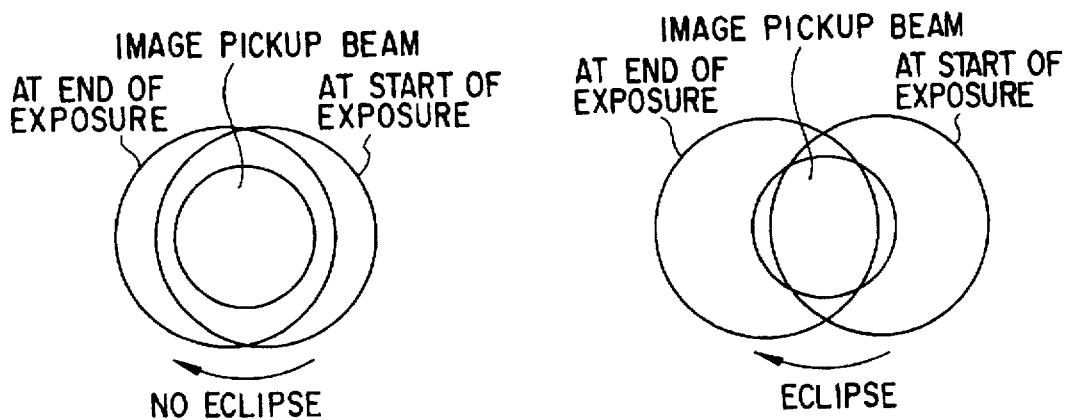
FIGS. 27A, 27B, and 27C are views, respectively, for explaining the conception of the 11th embodiment according to the present invention.

FIG. 27A shows a correct image pickup state, in which the filter completely covers the photographing beam.

FIG. 27B shows an eclipse occurrence state due to a long exposure time, in which the filter cannot completely cover the photographing beam.

The eclipse is caused by a longer exposure time of the image pickup device, compared to the rotation speed of the rotary filter.

In the 11th embodiment, therefore, a maximum exposure time computation unit 145 calculates the maximum exposure time free from any eclipse on the basis of the rotation speed of the rotary filter and the F-number of the optical system that determines the diameter of the image pickup beam, and a control unit 120 sets the exposure time of the image pickup device so as to be shorter than the maximum exposure time.

According to the 11th embodiment, proper photographing can always be performed without causing any eclipse.

(Modification)

In the case of a dark object and the like, the exposure time must be set longer to a certain degree. In such a case, the eclipse must be corrected.

Figure 29:
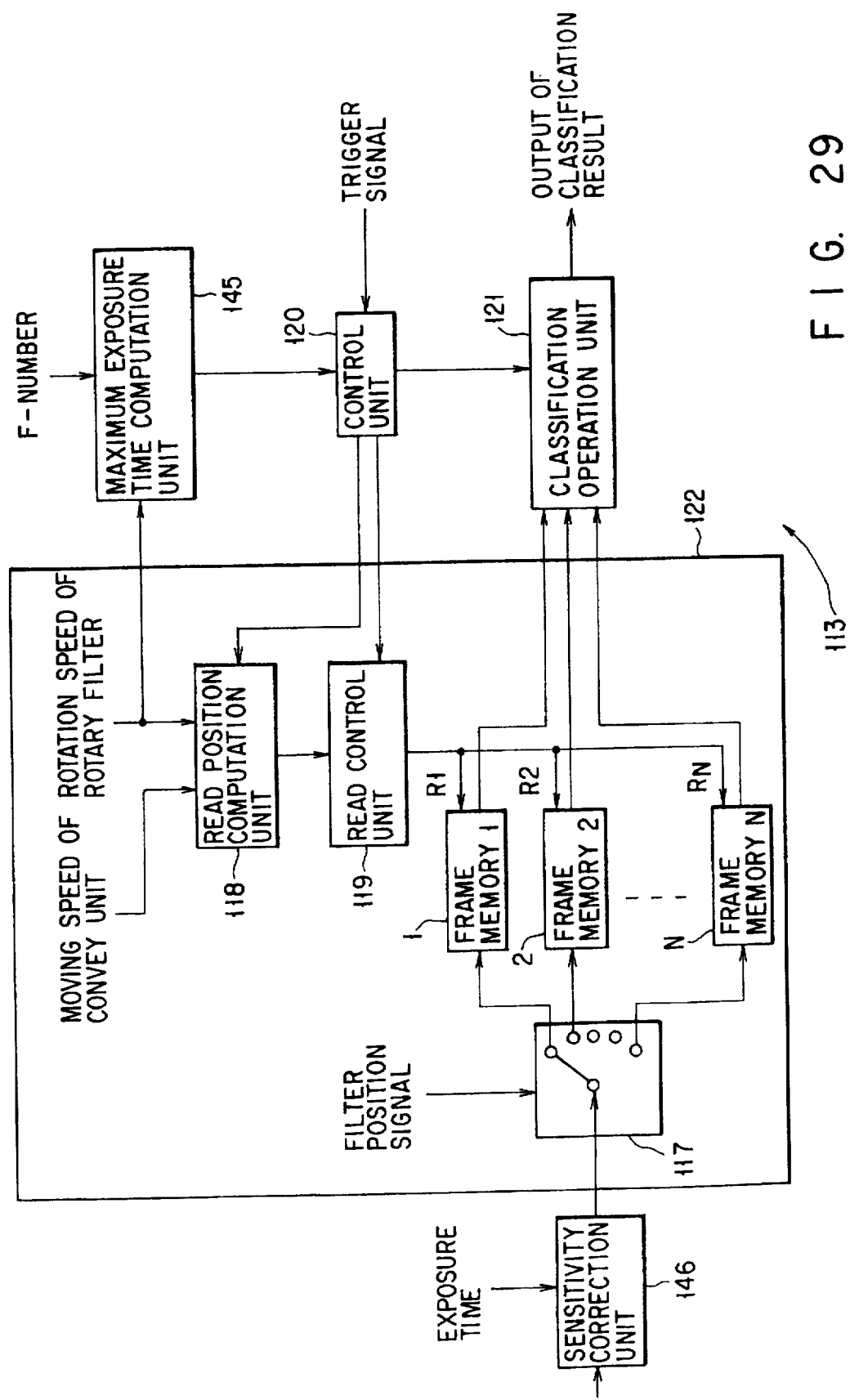
FIG. 29 is a view showing the schematic arrangement of a modification of the positional shift correction unit in the 11th embodiment of the present invention.

Since the eclipse leads to so-called sensitivity nonuniformity, the sensitivity is corrected by a sensitivity correction unit 146 in accordance with the eclipse, as shown in FIG. 29.

The modification of the 11th embodiment can cope with various photographing situations.

In the case of an interlaced scanning image pickup device, the eclipse occurs at a different position for each field. Taking this difference into consideration, the sensitivity correction unit 146 performs correction (different correction for each field).

Figure 27C:
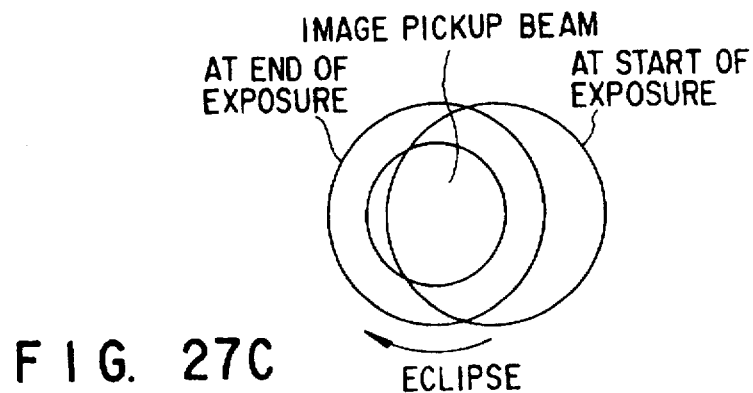
Figure 28:
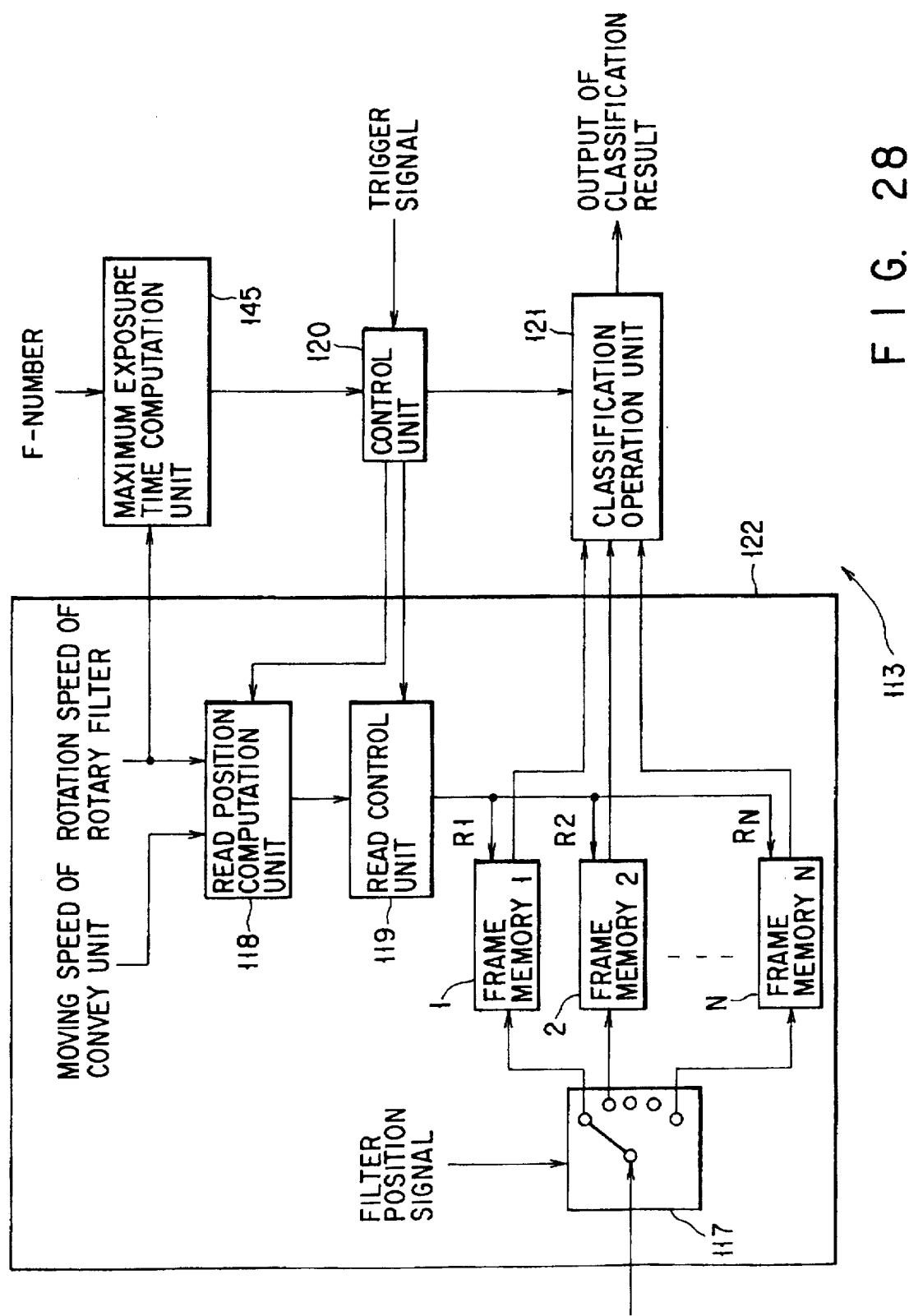
FIG. 28 is a view showing the schematic arrangement of a positional shift correction unit in the 11th embodiment of the present invention.

When the exposure start timing and the exposure end timing are asymmetrical about the beam, an asymmetrical eclipse occurs, as shown in FIG. 27C. Also in this case, this information is given to the sensitivity correction unit 146 in advance, and the sensitivity correction unit 146 performs correction.

(12th Embodiment)

Figure 31:
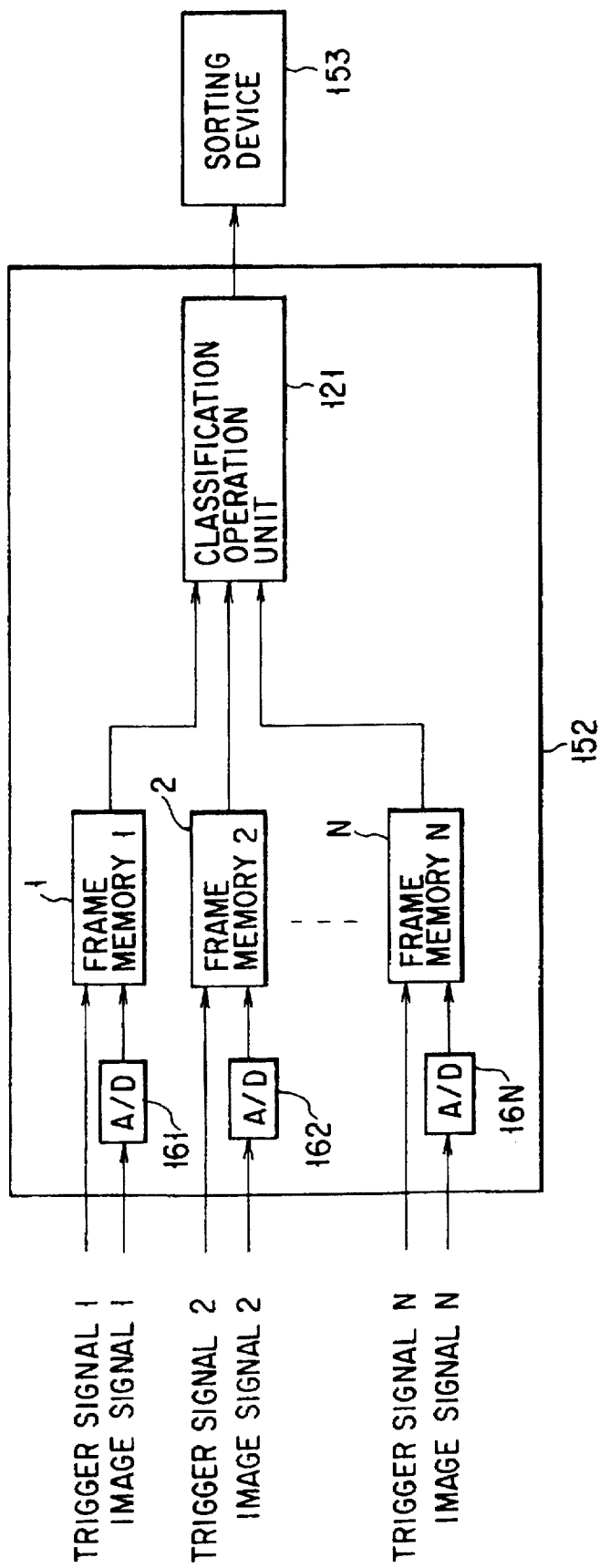
FIG. 31 is a view showing the schematic arrangement of a positional shift correction unit in the 12th embodiment of the present invention.
Figure 32:
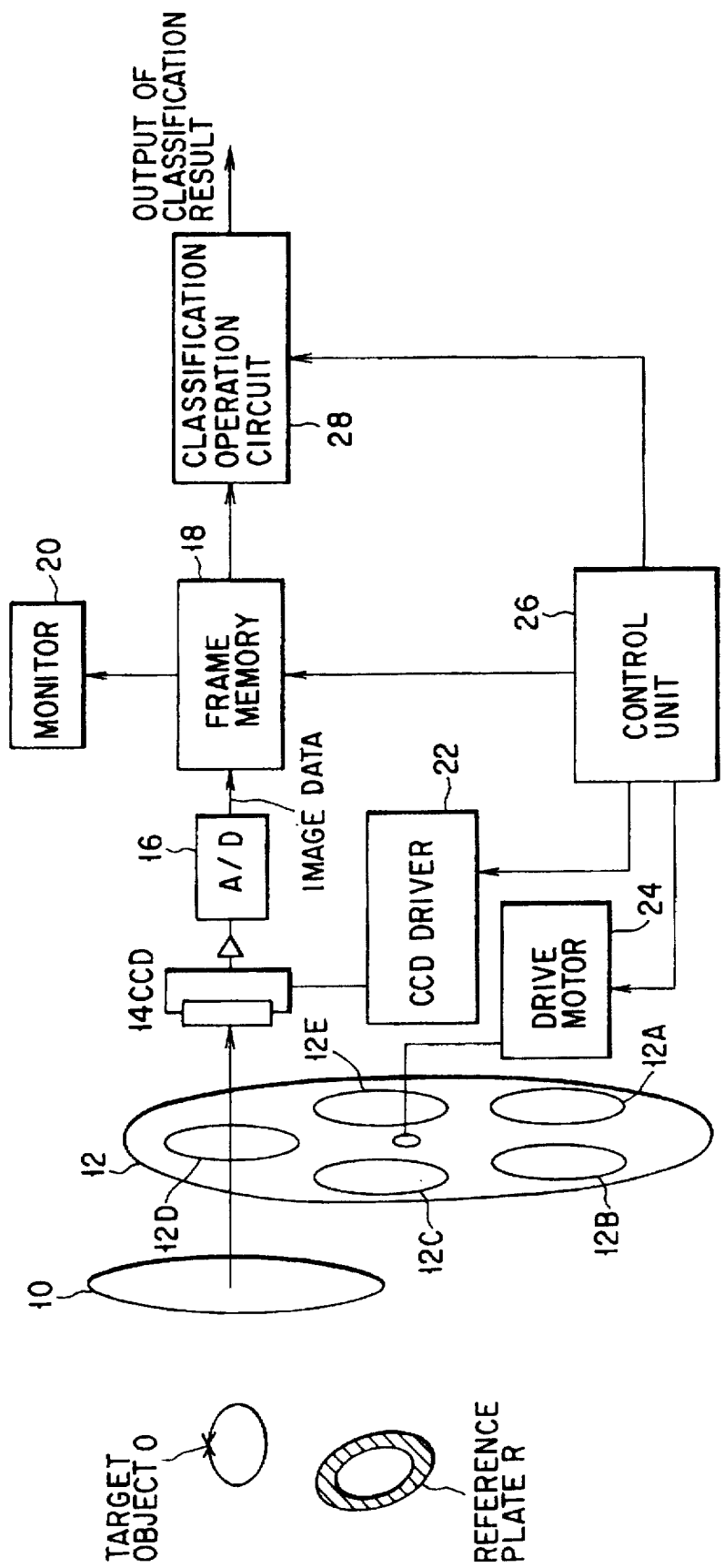
FIG. 32 is a view showing the arrangement of a color classification apparatus according to a prior application.
Figure 33A:
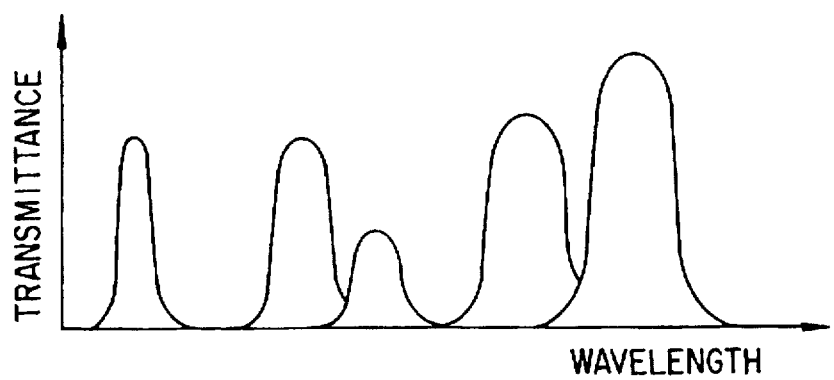
FIG. 33A is a graph showing the characteristics of a plurality of bandpass filters used for a rotary color filter used in the color classification apparatus according to the prior application.
Figure 33B:
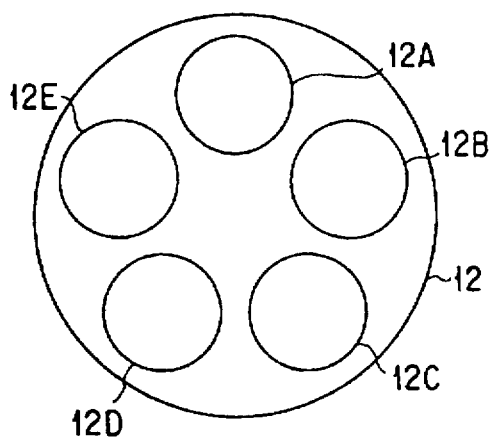
FIGS. 33B and 33C are views showing the arrangements, respectively, of the rotary color filter.
Figure 33C:
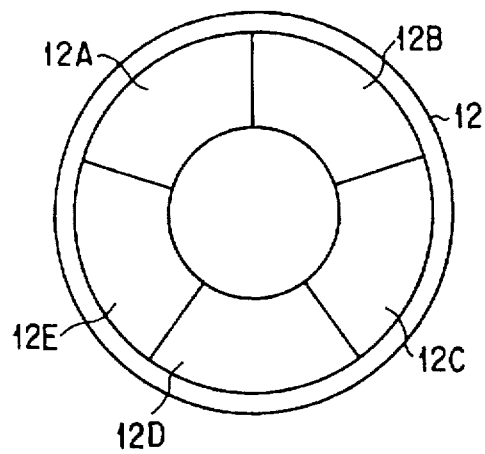
Figure 34:
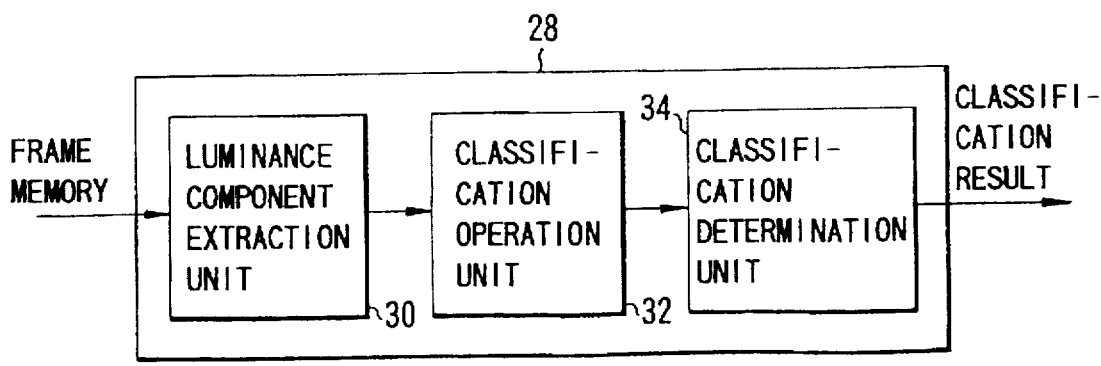
FIG. 34 is a block diagram showing the arrangement of a classification operation unit in FIG. 29.
Figure 35:
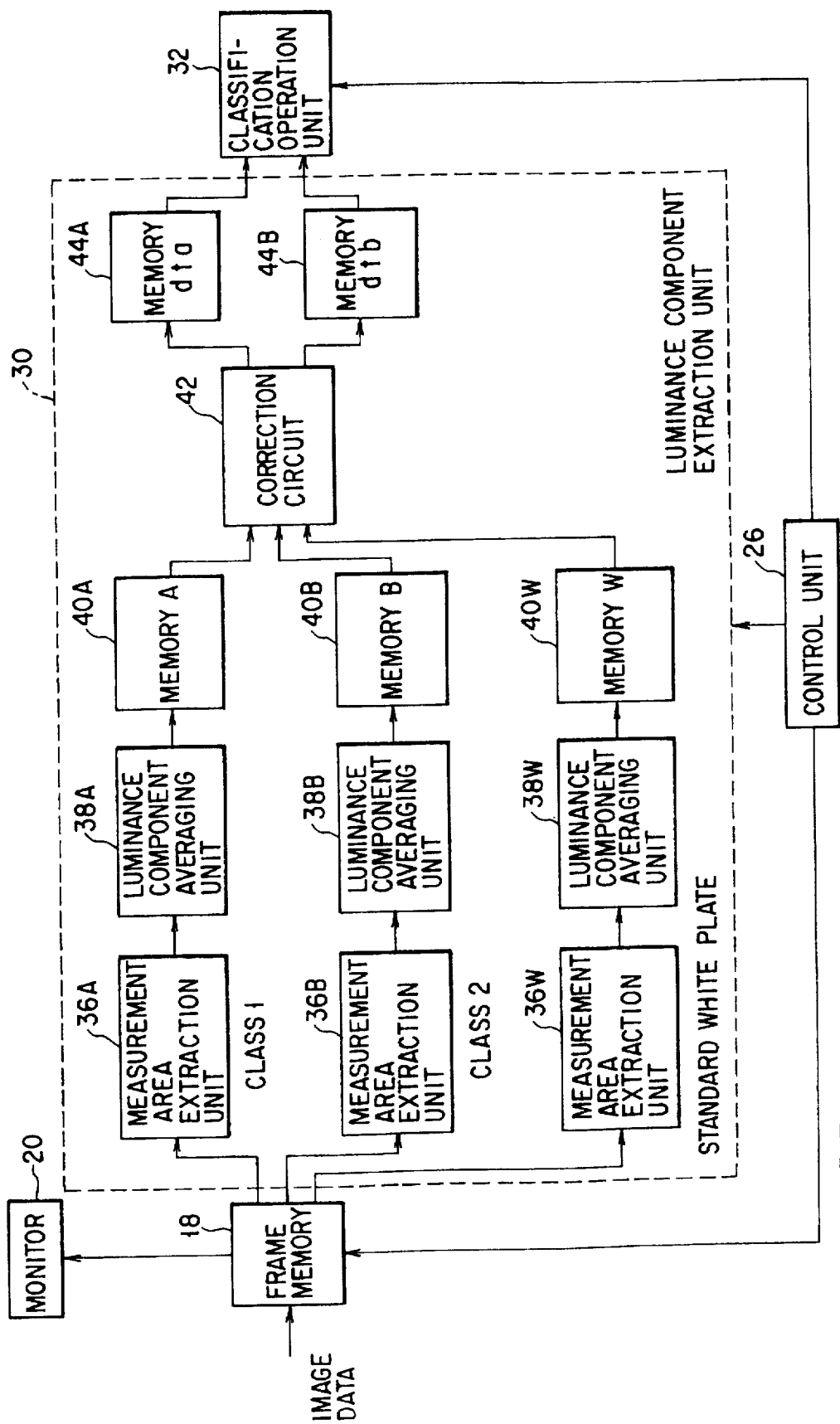
FIG. 35 is a view showing the arrangement of a luminance component extraction unit in FIG. 29.
Figure 40:
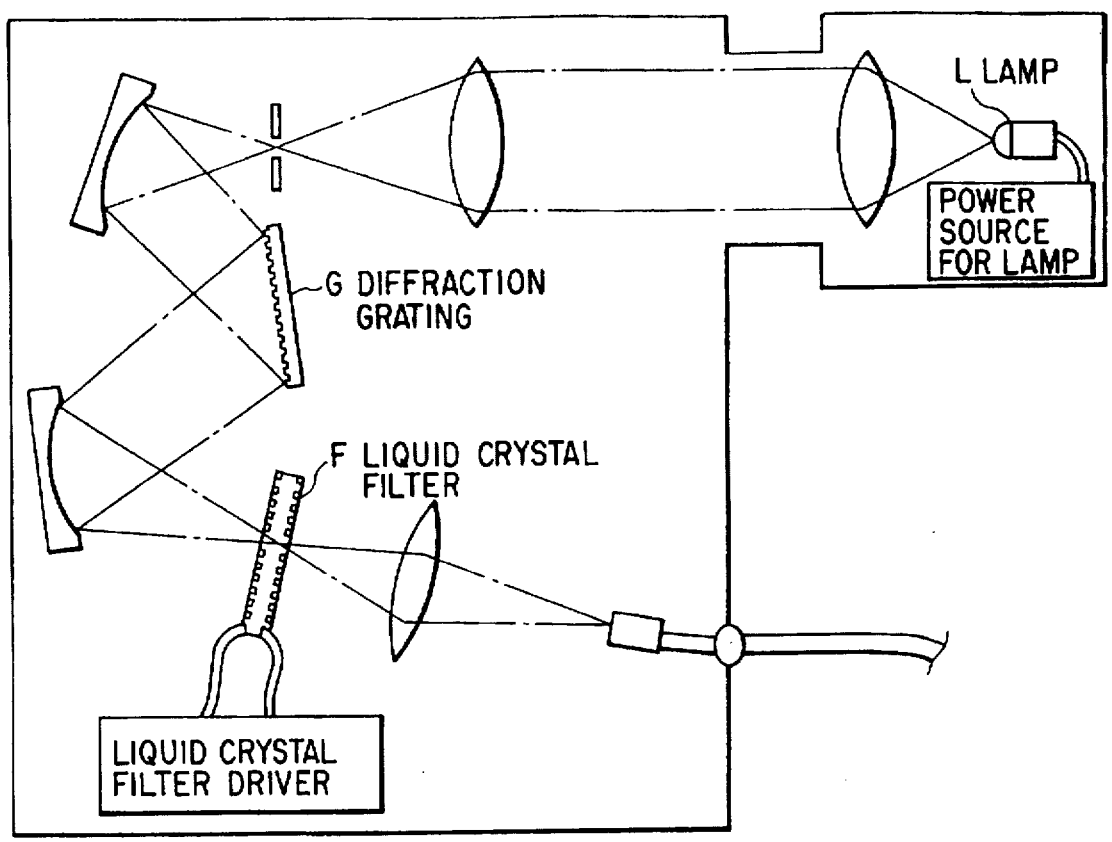
FIG. 40 is a view showing the arrangement of the arrangement of the classification operation unit in the prior application.
Figure 41:
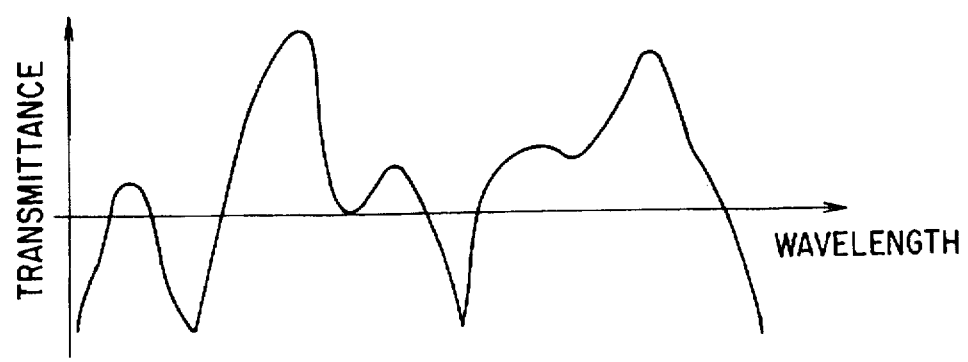
FIG. 41 is a graph showing the arrangement of a filter having classification characteristics in a conventional color classification apparatus.

FIGS. 30 and 31 exemplify a case as the 12th embodiment wherein a plurality of image pickup devices 151 are respectively arranged in correspondence with a plurality of position detection sensors 115, image signals from the plurality of image pickup devices 151 are separately processed by a control unit 152 and sorted by a sorting device 153.

The present invention has been described on the basis of the first to 12th embodiments 1 to 12. The present specification incorporates the following inventions.

(1) A color classification apparatus for classifying color components of target objects is characterized by comprising an imaging optical system, an image pickup device arranged on the imaging plane of the imaging optical system, optical bandpass filters optically arranged upstream the image pickup device and having a plurality of different selectable optical transmission wavelength bands, a transmission wavelength selection means for selecting one transmission wavelength band from the plurality of optical transmission wavelength bands, a storage means each for storing each image information which has passed through the optical bandpass filter having the transmission wavelength band selected by the transmission wavelength selection means and is picked up by the image pickup device, and transmission wavelength band information selected by the transmission wavelength selection means in correspondence with each other, a read means for performing read access to an area corresponding to the target object in each image information from the storage means, and a correction means for correcting, in accordance with a positional shift of each image information which of the target object is stored in the storage mean, the area in each image information to be read by the read means.

(Corresponding Embodiment)

The first to 10th embodiments correspond to this invention.

In the first embodiment, the rotary filter corresponds to the optical bandpass filters, and the motor, the motor drive circuit, and the filter position detection unit correspond to the transmission wavelength selection means.

(Function and Advantage)

The function and advantage of this invention are that target object information can be read freely from any positional shift by correcting the read position of the storage means by the correction means even when the target object moves in photographing via each filter.

(2) A color classification apparatus for classifying color components of target objects is characterized by comprising an imaging optical system, an image pickup device of an X-Y address scheme which performs storage on the imaging plane of the imaging optical system, optical bandpass filters optically arranged upstream the image pickup device and having a plurality of different selectable optical transmission wavelength bands, a transmission wavelength selection means for selecting one transmission wavelength band from the plurality of transmission wavelength bands, a read means for performing read access, from the image pickup device, to an area corresponding to the target object in each image information having passed through the optical bandpass filter having the transmission wavelength selected by the transmission wavelength selection means, and picked up by the image pickup device, and a means for correcting, in accordance with a positional shift of the image of the target object formed on the image pickup device, the address of the image pickup device at which the read means performs read access to the area.
(Corresponding Embodiment)

The third embodiment corresponds to this invention.

In the third embodiment, the rotary filter corresponds to the optical bandpass filters, and the motor, the motor drive circuit, and the filter position detection unit correspond to the transmission wavelength selection means.
(Function and Advantage)

The function and advantage of this invention are that, by using a device of the X-Y address scheme as an image pickup device, the read position of the image pickup device can be controlled by an address, so that the storage means as the one shown in (1) can be eliminated.

(3) A color classification apparatus described in (1) or (2) is characterized in that the correction means corrects the area of each image information to be read by the read means on the basis of a timing of selecting the transmission wavelength band of the optical bandpass filter by the transmission wavelength selection means and the moving speed of the target object.
(Corresponding Embodiment)

The first embodiment (particularly FIG. 2) corresponds to this invention.

In the first embodiment, the read control unit in FIG. 2 corresponds to the correction means.
(Function and Advantage)

The function and advantage of this invention are as follows. That is, the image pickup device sequentially captures image information having passed through the filters having respective bands. At this time, since the image pickup timing and the timing of selecting an optical bandpass filter are related to each other, the area of each image information to be read by the read means can be corrected on the basis of the timing of selecting the optical bandpass filter and the moving speed of the target object.

(4) A color classification apparatus described in (1) or (2) is characterized by further comprising a target object convey means for conveying the target object at a constant speed, a timing generation means for generating the exposure timing of the image pickup device, and a synchronism control means for controlling the selection means so as to perform selection of the optical bandpass filter in synchronism with the timing of the timing generation means, so that the correction means calculates the moving distance of the target object during a period between exposure timings generated by the timing generation means, by using the convey speed of the target object by the target object convey means, and corrects the area in each image information to be read by the read means, by using the obtained moving distance.
(Correcting Embodiment)

The first embodiment (particularly FIG. 4) corresponds to this invention.

In the first embodiment, the read control unit in FIG. 4 corresponds to the correction means, and synchronism control means may control to synchronize the timing of the timing generation means with the selection period of the optical bandpass filters.
(Function and Advantage)

With this arrangement, the selection period of the optical bandpass filters can be synchronized with the exposure period of the image pickup device, as shown in FIG. 4. In addition, the target object can be exposed when the filter exists on the optical axis of the imaging optical system.

The shift amounts of respective pieces of image information which have passed through the filters having different transmission wavelength bands, are picked up by the image pickup device, and stored in the storage means are calculated on the basis of the exposure period and the speed of conveying the target object convey means. The shifts can be corrected, and the respective pieces of image information can be read.

(5) A color classification apparatus described in (1) or (2) is characterized in that the correction means has a plurality of position detection means each for outputting a trigger signal upon detection of the target object, the image pickup means picks up an image at a timing at which the trigger signal is output, the transmission wavelength selection means selects the transmission wavelength of the filter upon completion of picking up the image, and the correction means further corrects the area in each image information to be read by the read means on the basis of an array interval between the plurality of position detection means.
(Corresponding Embodiment)

The seventh embodiment corresponds to this invention.
(Function and Advantage)

The function and advantage of this invention are as follows. That is, the plurality of position detection means are used, and pieces of image information are picked up in synchronism with trigger signals output therefrom. The shift amount of each image information depends on the array interval between the respective position detection means. For this reason, the areas in the respective pieces of image information to be read by the read means can be corrected on the basis of the array intervals between the plurality of position detection means. In addition, since the transmission wavelength selection means intermittently selects the transmission wavelength band of the filter upon completion of an image pickup operation, image information having passed through the filter can be reliably picked up.

(6) A color classification apparatus described in (1) is characterized in that the correction means has a position detection means for outputting a trigger signal upon detection of the target object, and a correlation operation means for reading out image information from storage means which corresponds to filters having adjacent optical transmission wavelength bands and is selected from the storage means storing image information, and calculating a correlation after the position detection means outputs the trigger signal, and corrects the area in each image information to be read by the read means on the basis of the trigger signal and the correlation result from the correlation operation means.
(Corresponding Embodiment)

The eighth and ninth embodiments correspond to this invention.

As shown in FIG. 23, the edge of image information read out from each storage means may be extracted before calculating the correlation by the correlation operation means. By extracting the edge, the shift amount of the image information stored in each storage means can be accurately grasped and corrected by the correction means.
(Function and Advantage)

The function and advantage of this invention are as follows. That is, the image information stored in each storage means is image information for a single spectrum. Since the correlation is established between two pieces of image information having closer spectra, a better correlation result can be obtained. At the same time, not only when the target object moves in only one direction, but also when the target object rotates and moves, the positional shift can be corrected by the correction means.

(7) A color classification apparatus described in any one of (1) to (6) is characterized in that the optical bandpass filters are constituted by an electrical control means and tunable filters having transmission wavelengths controlled by the electrical control means.

(Corresponding Embodiment)

The fourth embodiment corresponds to this invention.

(Function and Advantage)

The function and advantage of this invention are that the transmission wavelength effected when the target object enters the image pickup area can be changed by the electrical control means.

(8) A color classification apparatus for classifying color components of target objects is characterized by comprising an imaging optical system, an image pickup device arranged on the imaging plane of the imaging optical system, a plurality of band-like optical bandpass filters which are optically arranged immediately upstream the image pickup device, formed into band-like shapes, and have optical transmission wavelength bands different from each other, a means for conveying the target object, a storage means for storing each image information picked by the image pickup device at a period in which the convey means moves the image of the target object on the image pickup device by the width of each of the band-like optical bandpass filter, and a read means for performing read access to an area corresponding to a specific portion of the target object in each image information from the storage means storing the image information having passed through each band filter.

(Corresponding Embodiment)

The fifth embodiment corresponds to this invention.

(Function and Advantage)

The function and advantage of this invention are as follows. That is, the band-like optical bandpass filters are optically arranged on the front surface of one image pickup device to divide an image of the target object into band-like images and capture them. Therefore, the apparatus copes with a target object so large as not to pick up its image at once. In addition, a mechanism for rotating the filter, or the like can be eliminated.

(9) A color classification apparatus described in (5) or (6) is characterized in that the position detection means has a monitor image pickup means for picking up the image of an area where the target object is expected to pass, and obtaining image information, a background information storage means for averaging and storing in advance luminance information of the image information obtained after the monitor image pickup means picks up the image of a background where the target object does not exist, an image information averaging means for averaging the luminance information of the image information obtained after the monitor image means picks up the image, and a comparison means for comparing the averaged luminance information of the image information of the background which is stored in the background information storage means with the luminance information of the image information which is averaged by the image information averaging means, and outputs the trigger signal upon determining that the target object exists in the area where the target object is expected to pass when the comparison results of the comparison means have a difference.

(Corresponding Embodiment)

The sixth embodiment corresponds to this invention.

In this invention, the monitor image pickup means may serve as part of the image pickup means.

(10) A color classification apparatus described in (5) or (6) is characterized in that the position detection means have a monitor image pickup means for picking up the image of an area where the target object is expected to pass, and obtaining image information, an extraction means for extracting the pattern of the obtained image information picked up by the monitor image pickup means, and a determination means for determining whether specific pattern information extracted by the extraction means is a specific pattern of the target object, and outputs trigger signals upon determining that the target object exists in the area where the target object is expected to pass when the determination means determines that the specific pattern information is the specific pattern of the target object.

(Corresponding Embodiment)

The sixth embodiment corresponds to this invention.

In this invention, the specific pattern may be edge information.

(11) A color classification apparatus for classifying color components of target objects is characterized by comprising an imaging optical system, a plurality of line sensors arranged such that the longitudinal direction is substantially parallel to the imaging plane of the imaging optical system, a plurality of optical bandpass filters optically arranged upstream the line sensors such that each color corresponds to each line sensor, and having optical transmission wavelength bands different from each other, a storage means for storing each image information picked up by the line sensor, a read means for performing read access to an area corresponding to the target object in each image information from the storage means storing the image information having passed through each band filter, and a correction means for correcting, in accordance with a positional shift of each image information of the target object which is stored in the storage means, the area of each image information to be read by the read means.

(Corresponding Embodiment)

The 10th embodiment corresponds to this invention.

(Function and Advantage)

The function and advantage of this invention are as follows. That is, information about respective band images of the target object are stored in the storage means by the plurality of line sensors. In addition, the shift amount of each image information depends on the array interval between the respective line sensors. Therefore, the area of each image information to be read by the read means can be corrected by the array interval between the respective line sensors.

(12) A color classification apparatus described in (11) is characterized in that the correction means is constituted by a position detection means for outputting a trigger signal upon detection of the target object, and a sensor interval storage means for storing an array interval between the line sensors, and corrects the area of each image information to be read by the read means in accordance with the trigger signal and the stored array interval between the line sensors.

(Corresponding Embodiment)

The 10th embodiment corresponds to this invention.

(13) A color classification apparatus described in (1) or (2) is characterized by further comprising an exposure time adjustment means for adjusting the exposure time of the image pickup means, an F-number control means for controlling the F-number of the imaging optical system, and a control means for controlling at least one of the transmission wavelength selection means, the exposure time adjustment means, and the F-number control means such that the image pickup beam of the imaging optical system on a plane having the optical bandpass filters arrayed thereon passes through the optical bandpass filter without causing any eclipse during the exposure time adjusted by the exposure time adjustment means.

(Corresponding Embodiment)

The 11th embodiment corresponds to this invention.

(Function and Advantage)

The function and advantage of this invention are as follows. That is, even if the filter moves during exposure time, the image pickup beam passes a portion where the pass area of the moving filter overlaps, and reaches the image pickup device without causing any eclipse under the control of the control means. If the eclipse occurs, the control means controls to eliminate the eclipse by performing at least one of processes, i.e., to decrease the exchange speed of the filters, to short the exposure time, or to decrease the F-number and decease the diameter of the entrance pupil.

(14) A color classification apparatus described in (13) is characterized by further comprising an eclipse information storage means for storing eclipse information of the image pickup beam which is caused by each optical bandpass filter, and a sensitivity correction means for correcting each image information picked up by the image pickup device, by using the information stored in the eclipse information storage means before storing each image information in the storage means.

(Corresponding Embodiment)

The modification (FIG. 29) of the 11th embodiment corresponds to this invention.

(Function and Advantage)

The function and advantage of this invention are as follows. That is, even under the control of the control means described in (13), the eclipse may occur due to some reason. The reason of occurrence of the eclipse is considered as a change in factor which is not directly related to the control (e.g., deformation of the rotary filter). Occurrence of the eclipse leads to luminance nonuniformity in the image information of the target object, which seems occurrence of illumination nonuniformity. In this case, the image of the target object is not picked up, and only the eclipse information of the image pickup beam is captured and stored in the eclipse information storage means. By using this information, each image information picked up by the image pickup device is corrected before storing it in the storage means, thereby obtaining image information almost free from any eclipse.

(15) A color classification apparatus described in (1) or (2) is characterized by further comprising a filter shift amount storage means for storing the imaging positional shift of the imaging optical system which is caused by a filter mounting error of the optical bandpass filters in correspondence with a filter of each transmission wavelength band, so that the read means corrects a read position for each transmission wavelength band by using the imaging positional shift information stored in the filter shift amount storage means.

(Corresponding Embodiment)

The second embodiment corresponds to this invention.

As has been described above, therefore, according to the present invention, there can be provided a color classification system including a color classification apparatus and a color classification method which can accurately classify the colors of target objects by performing a desired classification calculation based on multispectral image data obtained upon correction of the positional shift of the photographed image when the image pickup positional shifts.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A color classification apparatus for classifying color components of target objects, comprising:

an imaging optical system;

an image pickup device arranged on an imaging plane of said imaging optical system;

optical bandpass filters optically arranged upstream said image pickup device and having a plurality of different selectable optical transmission wavelength bands;

transmission wavelength selection means for selecting one transmission wavelength band from the plurality of optical transmission wavelength bands;

storage means each for storing each image information which has passed through said optical bandpass filter having the transmission wavelength band selected by said transmission wavelength selection means and is picked up by said image pickup device, and transmission wavelength band information selected by said transmission wavelength selection means in correspondence with each other;

read means for performing read access to an area corresponding to said target object in each image information from said storage means; and correction means for correcting, in accordance with a positional shift of each image information of said target object stored in said storage means, the area in each image information to be read by said read means.

2. A color classification apparatus for classifying color components of target objects, comprising:

an imaging optical system;

an image pickup device of an X-Y address scheme which performs storage on an imaging plane of said imaging optical system;

optical bandpass filters optically arranged upstream said image pickup device and having a plurality of different selectable optical transmission wavelength bands;

transmission wavelength selection means for selecting one transmission wavelength band from the plurality of transmission wavelength bands;

read means for performing read access, from said image pickup device, to an area corresponding to said target object in each image information having passed through said optical bandpass filter, having the transmission wavelength selected by said transmission wavelength selection means, and picked up by said image pickup device; and means for correcting, in accordance with a positional shift of an image of said target object formed on said image pickup device, an address of said image pickup device at which said read means performs read access to the area.

3. A color classification apparatus according to claim 1 or 2, characterized in that said correction means corrects the area of each image information to be read by said read means on the basis of a timing of selecting the transmission wavelength band of said optical bandpass filter by said transmission wavelength selection means and a moving speed of said target object.

4. A color classification apparatus according to claim 1 or 2, characterized by further comprising:

target object convey means for conveying said target object at a constant speed;

timing generation means for generating an exposure timing of said image pickup device; and synchronism control means for controlling said selection means so as to perform selection of said optical bandpass filter in synchronism with the timing of said timing generation means, so that said correction means calculates a moving distance of said target object during a period between exposure timings generated by said timing generation means, by using a convey speed of said target object by said target object convey means, and corrects the area in each image information to be read by said read means, by using the obtained moving distance.

5. A color classification apparatus according to claim 1 or 2, characterized in that said correction means has a plurality of position detection means each for outputting a trigger signal upon detection of said target object, said image pickup means picks up an image at a timing at which the trigger signal is output, said transmission wavelength selection means selects the transmission wavelength of said filter upon completion of picking up the image, and said correction means further corrects the area in each image information to be read by said read means on the basis of an array interval between said plurality of position detection means.

6. A color classification apparatus according to claim 1 or 2, characterized in that said correction means has position detection means for outputting a trigger signal upon detection of said target object, and correlation operation means for reading out image information from storage means which corresponds to filters having adjacent optical transmission wavelength bands and is selected from said storage means storing image information, and calculating a correlation after said position detection means outputs the trigger signal, and corrects the area in each image information to be read by said read means on the basis of the trigger signal and a correlation result from said correlation operation means.

7. A color classification apparatus according to claim 1 or 2, characterized in that said optical bandpass filters are constituted by electrical control means and tunable filters having transmission wavelengths controlled by said electrical control means.

8. A color classification apparatus according to claim 5, characterized in that said position detection means have monitor image pickup means for picking up an image of an area where said target object is expected to pass, and obtaining image information, background information storage means for averaging and storing in advance luminance information of the image information obtained after said monitor image pickup means picks up an image of a background where said target object does not exist, image information averaging means for averaging the luminance information of the image information obtained after said monitor image means picks up the image, and comparison means for comparing the averaged luminance information of the image information of the background which is stored in said background information storage means with the luminance information of the image information which is averaged by said image information averaging means, and outputs the trigger signal upon determining that said target object exists in the area where said target object is expected to pass when comparison results of said comparison means have a difference.

9. A color classification apparatus according to claim 6, characterized in that said position detection means has monitor image pickup means for picking up an image of an area where said target object is expected to pass, and obtaining image information, background information storage means for averaging and storing in advance luminance information of the image information obtained after said monitor image pickup means picks up an image of a background where said target object does not exist, image information averaging means for averaging the luminance information of the image information obtained after said monitor image means picks up the image, and comparison means for comparing the averaged luminance information of the image information of the background which is stored in said background information storage means with the luminance information of the image information which is averaged by said image information averaging means, and outputs the trigger signal upon determining that said target object exists in the area where said target object is expected to pass when comparison results of said comparison means have a difference.

10. A color classification apparatus according to claim 5, characterized in that said position detection means have monitor image pickup means for picking up an image of an area where said target object is expected to pass, and obtaining image information, extraction means for extracting a pattern of the obtained image information picked up by said monitor image pickup means, and determination means for determining whether specific pattern information extracted by said extraction means is a specific pattern of said target object, and outputs trigger signals upon determining that said target object exists in the area where said target object is expected to pass when said determination means determines that the specific pattern information is the specific pattern of said target object.

11. A color classification apparatus according to claim 6, characterized in that said position detection means has monitor image pickup means for picking up an image of an area where said target object is expected to pass, and obtaining image information, extraction means for extracting a pattern of the obtained image information picked up by said monitor image pickup means, and determination means for determining whether specific pattern information extracted by said extraction means is a specific pattern of said target object, and outputs the trigger signal upon determining that said target object exists in the area where said target object is expected to pass when said determination means determines that the specific pattern information is the specific pattern of said target object.

12. A color classification apparatus according to claim 1 or 2, characterized by further comprising: exposure time adjustment means for adjusting an exposure time of said image pickup means; F-number control means for controlling an F-number of said imaging optical system; and control means for controlling at least one of said transmission wavelength selection means, said exposure time adjustment means, and said F-number control means such that an image pickup beam of said imaging optical system on a plane having said optical bandpass filters arrayed thereon passes through said optical bandpass filter without causing any eclipse during the exposure time adjusted by said exposure time adjustment means.

13. A color classification apparatus according to claim 12, characterized by further comprising: eclipse information storage means for storing eclipse information of the image pickup beam which is caused by each optical bandpass filter: and sensitivity correction means for correcting each image information picked up by said image pickup device, by using the information stored in said eclipse information storage means before storing each image information in said storage means.

14. A color classification apparatus according to claim 1 or 2, characterized by further comprising: filter shift amount storage means for storing an imaging positional shift of said imaging optical system due to a filter mounting error of said optical bandpass filters in correspondence with a filter of each transmission wavelength band, so that said read means corrects a read position for each transmission wavelength band by using information about the imaging positional shift stored in said filter shift amount storage means.

15. A color classification apparatus for classifying color components of target objects, comprising:

an imaging optical system;

an image pickup device arranged on an imaging plane of said imaging optical system;

a plurality of band-like optical bandpass filters which are optically arranged immediately upstream said image pickup device, formed into band-like shapes, and have optical transmission wavelength bands different from each other;

means for conveying said target object;

storage means for storing each image information picked by said image pickup device at a period in which said convey means moves an image of said target object on said image pickup device by a width of each of said band-like optical bandpass filter; and read means for performing read access to an area corresponding to a specific portion of said target object in each image information from said storage means storing the image information having passed through each band filter.

16. A color classification apparatus for classifying color components of target objects, comprising:

an imaging optical system;

a plurality of line sensors arranged such that a longitudinal direction is substantially parallel to an imaging plane of said imaging optical system;

a plurality of optical bandpass filters optically arranged upstream said line sensors such that each color corresponds to each line sensor, and having optical transmission wavelength bands different from each other;

storage means for storing each image information picked up by said line sensor;

read means for performing read access to an area corresponding to said target object in each image information from said storage means storing the image information having passed through each band filter; and correction means for correcting, in accordance with a positional shift of each image information of said target object stored in said storage means, the area of each image information to be read by said read means.

17. A color classification apparatus according to claim 16, characterized in that said correction means is constituted by position detection means for outputting a trigger signal upon detection of said target object, and sensor interval storage means for storing an array interval between said line sensors, and corrects the area of each image information to be read by said read means in accordance with the trigger signal and the stored array interval between said line sensors.

* * * * *